US00RE34234E

United States Patent [19]

Kuroiwa et al.

[11] E Patent Number: Re. 34,234

[45] Reissued Date of Patent: Apr. 27, 1993

[54] CONTROL APPARATUS FOR INTERNAL COMBUSTION ENGINES

[75] Inventors: Hiroshi Kuroiwa, Hitachi; Yoshishige Oyama, Katsuta; Toshiharu Nogi, Hitachi, all of Japan

[73] Assignee: Hitachi, Ltd., Tokyo, Japan

[21] Appl. No.: 808,812

[22] Filed: Dec. 17, 1991

Related U.S. Patent Documents

Reissue of:

[64] Patent No.: 4,887,574
Issued: Dec. 19, 1989
Appl. No.: 184,076
Filed: Apr. 20, 1988

[30] Foreign Application Priority Data

Apr. 21, 1987 [JP] Japan ..... 62-96123
Jun. 3, 1987 [JP] Japan ..... 62-138071

[51] Int. Cl.[5] ..... F02P 5/10; G01L 23/22; G01M 15/00

[52] U.S. Cl. ..... 123/425; 123/435; 73/116; 73/35

[58] Field of Search ..... 123/419, 425, 435, 436, 123/494, 479, 630; 73/35 R, 35 K, 35 O, 116, 119 R

[56] References Cited

U.S. PATENT DOCUMENTS 3,067,610 12/1962 Bockemuehl et al. ..... 73/35
4,437,334 3/1984 Laurenz ..... 73/35
4,446,723 5/1984 Boning et al. ..... 73/35
4,779,455 10/1988 Kuroiwa et al. ..... 73/116

FOREIGN PATENT DOCUMENTS 3410067 9/1985 Fed. Rep. of Germany ..... 123/435
186040 11/1982 Japan .
13137 1/1983 Japan .
162329 9/1984 Japan ..... 123/435
17239 1/1985 Japan .
56150 4/1985 Japan .

*Primary Examiner*—Willis R. Wolfe
*Attorney, Agent, or Firm*—Antonelli, Terry, Stout & Kraus

[57] ABSTRACT

An internal combustion engine control apparatus has a digital arithmetic unit to which signals are inputted from a plurality of detectors such as detectors for detecting an operational state of the engine and air fuel ratio detector and controls a fuel air ratio and ignition timing according to output signals from the arithmetic unit. The apparatus comprises by a misfire detector for detecting a misfiring state of the engine, NOx concentration detector and a controller for controlling the fuel air ratio and the ignition timing so as to fall within a tolerable stable combustion range defined by a detected misfire boundary and a detected NOx limit. The misfiring state and/or NOx concentration can be detected through detection of temperature change in the combustion chamber by a detector. The detector comprises a black body disposed in the combustion chamber and a fused silica cable mounting the black body.

24 Claims, 19 Drawing Sheets

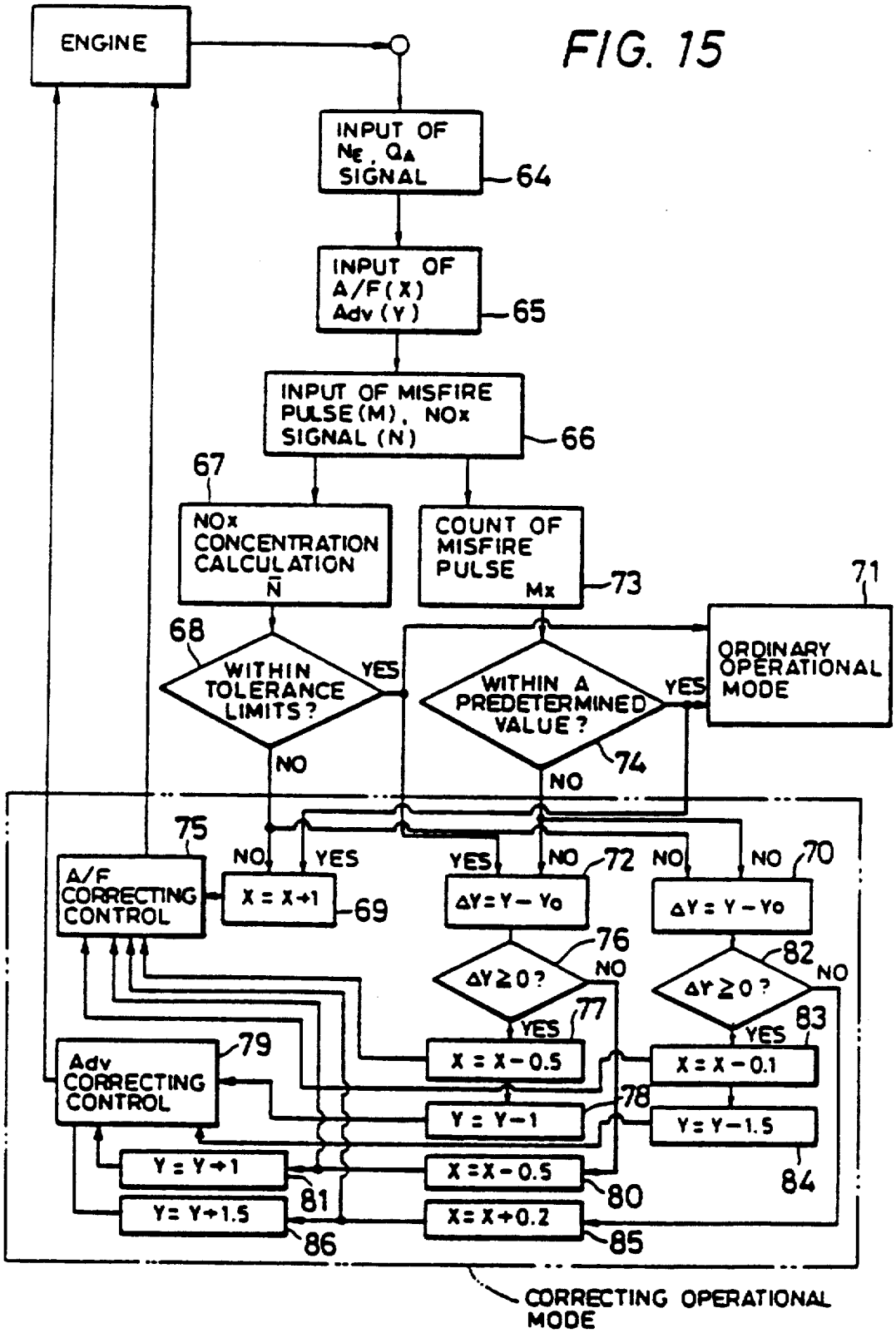
FIG. 15
ENGINE
INPUT OF Nε, QA SIGNAL
64
INPUT OF A/F (X) Adv (Y)
65
INPUT OF MISFIRE PULSE (M), NOx SIGNAL (N)
66
67
NOx CONCENTRATION CALCULATION N̄
COUNT OF MISFIRE PULSE Mx
73
71
ORDINARY OPERATIONAL MODE
68
WITHIN TOLERANCE LIMITS?
YES
NO
WITHIN A PREDETERMINED VALUE?
YES
NO
74
75
A/F CORRECTING CONTROL
NO
YES
X = X+1
69
YES
NO
72
ΔY = Y − Yo
NO
NO
70
ΔY = Y − Yo
76
ΔY ≥ 0?
NO
YES
77
X = X − 0.5
82
ΔY ≥ 0?
NO
YES
83
X = X − 0.1
79
Adv CORRECTING CONTROL
Y = Y−1
78
Y = Y−1.5
84
Y = Y+1
81
X = X − 0.5
80
Y = Y+1.5
86
X = X+0.2
85
CORRECTING OPERATIONAL MODE

CONTROL APPARATUS FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

This invention relates to a control apparatus for internal combustion engines and, more particularly, to apparatus for controlling the fuel air ratio and the ignition timing of a lean-burn engine so as to keep them within the target range.

In a control apparatus for internal combustion engine, for example, a conventional lean burn control apparatus detects the air fuel ratio controlled by a lean sensor which produces a signal corresponding to the concentration of the oxygen in exhaust gas and controls the detected air fuel ratio so as to be the same as the target lean air fuel ratio, as described in Japanese Patent Laid-Open No. 279747/1987.

The target lean air fuel ratio is set at a specific air fuel ratio within the air fuel ratio range defined by the misfire boundary air fuel ratio of an engine and the air fuel ratio determined by the NOx limit necessary to clear a regulation of exhaust gas, namely, at a specific air fuel ratio within the target control range.

In the above-described prior art, however, a change of an engine with time is not taken into adequate consideration, and the target lean air fuel ratio set in the above-described way keeps a constant value irrespective of a change of the engine with time. Since it is expected that a change of the engine with time, a change in fuel property, a change in the atmosphere condition and the like move the misfire boundary to the high air fuel ratio side, the target lean air fuel ratio is conventionally set in advance at a value on a fuel rich side of the target control range (in FIG. 3) in consideration of the above-described movement of the misfire boundary. This fact makes a sacrifice of fuel cost and brings about a problem such as the increase in an amount of exhausted NOx with the increase in the weight of the car body, thereby making it difficult to clear the regulation of exhaust gas.

SUMMARY OF THE INVENTION

An object of the invention is to provide a control apparatus for an internal combustion engine which is constantly capable of determining an appropriate target control range and controlling the engine so as to run within the target control range.

Another object of the invention is to provide a lean-burn control apparatus which is constantly capable of determining an appropriate target control range in accordance with a change of an engine with time or the like and controlling the lean air fuel ratio so as to keep it within the target range.

According to an aspect of the invention, a lean-burn control apparatus is characterized by misfire means for detecting a misfiring state of said engine; means for detecting NOx concentration information of said engine; and means for controlling said fuel air ratio and said ignition timing so as to fall within a tolerable stable combustion range which is defined based on signals from misfire detector and said NOx concentration information detector, and in which combustion is stable and produces NOx of a tolerable concentration.

In an internal combustion engine control, it is preferable to provide a temperature sensor or detector employing a black body which can directly detect temperature change in the combustion chamber, and which comprises a thin black body film and an optical transmission element connected to the black body film for transmitting radiant energy generated by the black body film.

BRIEF DESCRIPTION OF THE DRAWINGS

FIG. 15 a detailed whole flow chart of lean-burn control according to the present invention;

DETAILED DESCRIPTION OF THE INVENTION

Description will be made on a lean-burn control of an aspect of the invention.

First of all, in the lean-burn control, the misfire boundary and the NOx limit are detected.

Figure 4:
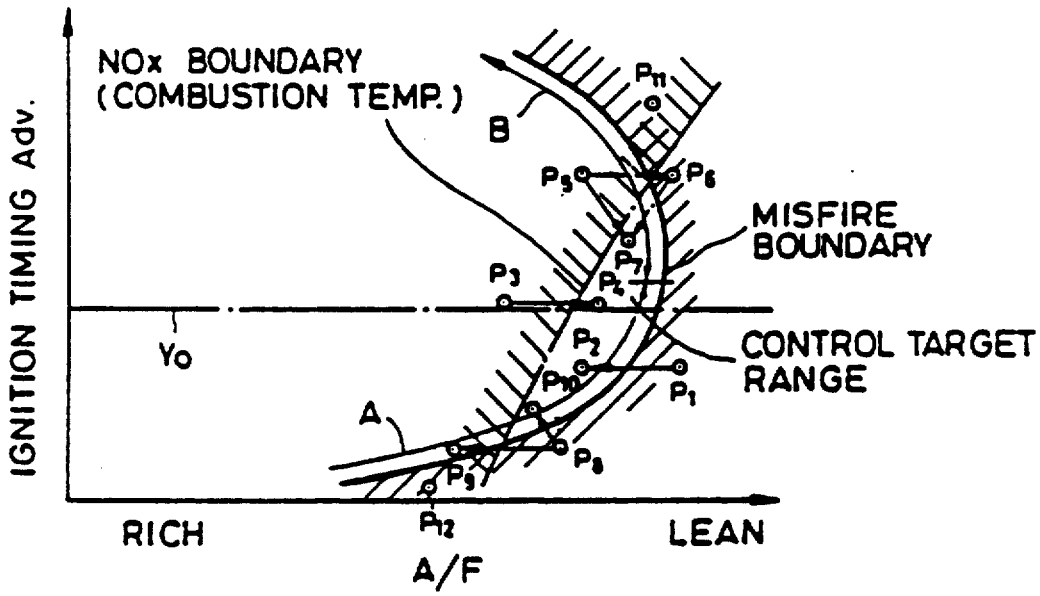
FIG. 4 is a graphical illustration showing the characteristics of air fuel ratio and ignition timing.

The misfire boundary and the NOx limit have characteristics shown in FIG. 4 with respect to air fuel ratio and ignition timing. The misfire boundary consists of the misfire boundary -A- on an advanced ignition timing side and the misfire boundary -B- on a [delay] *retarded* ignition timing side. The NOx limit comes closer to the lean air fuel ratio side as the ignition timing advances. As engine torque to the weight of the car becomes smaller due to the progress of lean-burn, the NOx limit moves to the right-hand side in FIG. 4 and, hence, the target control range defined by the NOx limit and the misfire boundary becomes smaller, thereby making the control difficult.

The misfire cycle includes a defective ignition cycle -B- in which a spark does not produce a flame nucleus, and a defective flame propagation cycle -A- in which ignition does not grow the flame. Both of these cycles are a cycle which produces little combustion flame light, so that it is possible to detect a misfire cycle from the intensity of the combustion light or the combustion temperature. On the other hand, it is known that NOx is a parameter of a combustion temperature. It is also said that the emission spectrum of NOx is a wavelength of 5.3 μm and the light intensity at this wavelength is a function of the concentration of NOx.

Therefore, the misfire cycle and the concentration of NOx can be detected through detection of the combustion light or the combustion temperature in the combustion chamber of an engine.

Next, a control target range for effecting lean-burn of an internal combustion engine is determined by using the detected misfire cycle and the detected NOx concentration.

Finally, the ignition time and the air fuel ratio are set in the control range defined by the misfire cycle and the concentration of NOx.

In an internal combustion engine control, it is preferable to directly detect the temperature in the engine. A temperature detector using black body suitable to detect such a temperature is provided.

An embodiment of the present invention will be explained in detail hereinunder.

Figure 1:
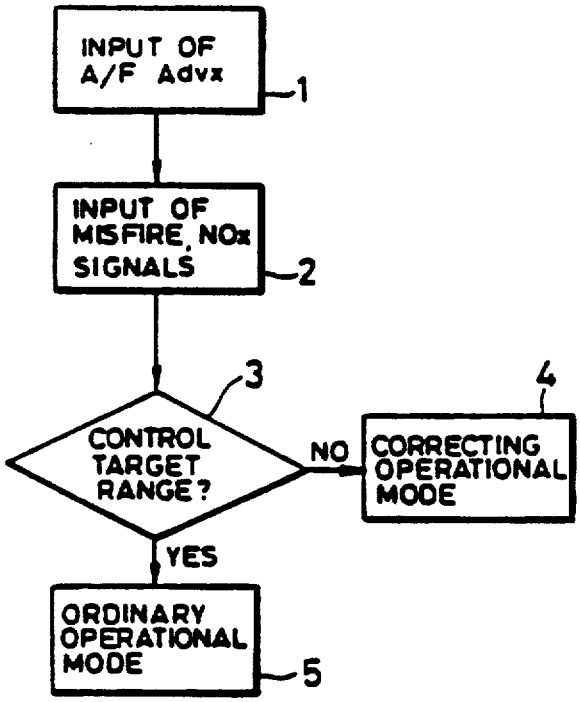
FIG. 1 is a flow chart of a lean-burn control for explaining an embodiment of the present invention.

In FIG. 1 showing a schematic control flow chart, on steps 1 and 2, signals of an air fuel ratio A/F, an ignition timing Adv, misfire and NOx are inputted to a digital arithmetic unit of a microcomputer. At step 3, judgement is made as to whether or not the misfire signal and the NOx signal are in the target control range which is determined by a misfire boundary and a NOx limit. If these signals are out of the target control range, the process is moved to the correcting operational mode at step 4 to control the A/F and the Adv so as to enter the target control range. If these signal are in the target control range, the process is moved to the ordinary operational mode at block 5 to carry out ordinary control.

Figure 2:
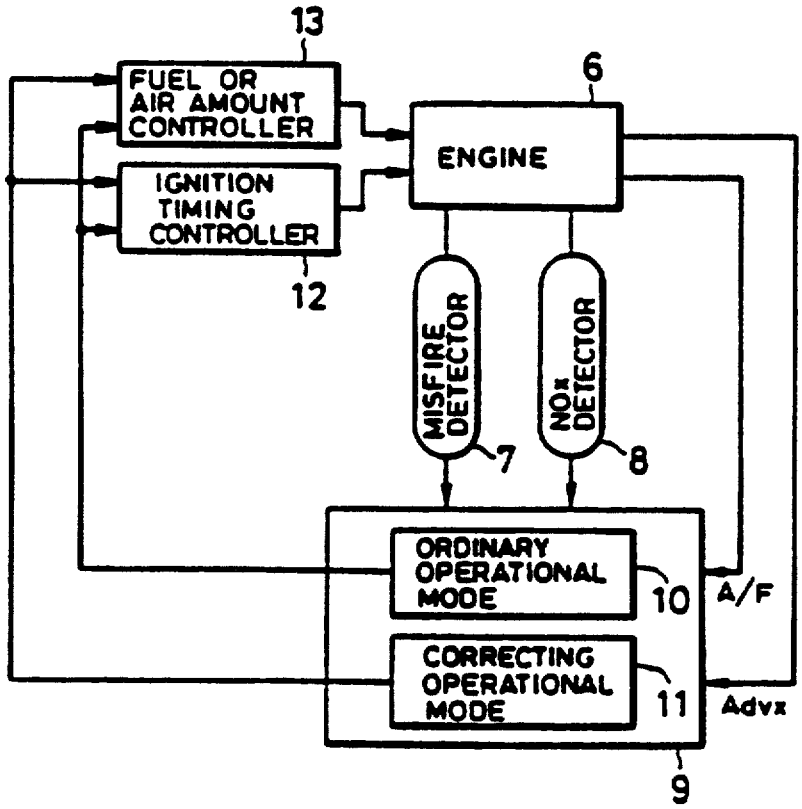
FIG. 2 is a schematic diagram of a lean-burn control apparatus.
Figure 3:
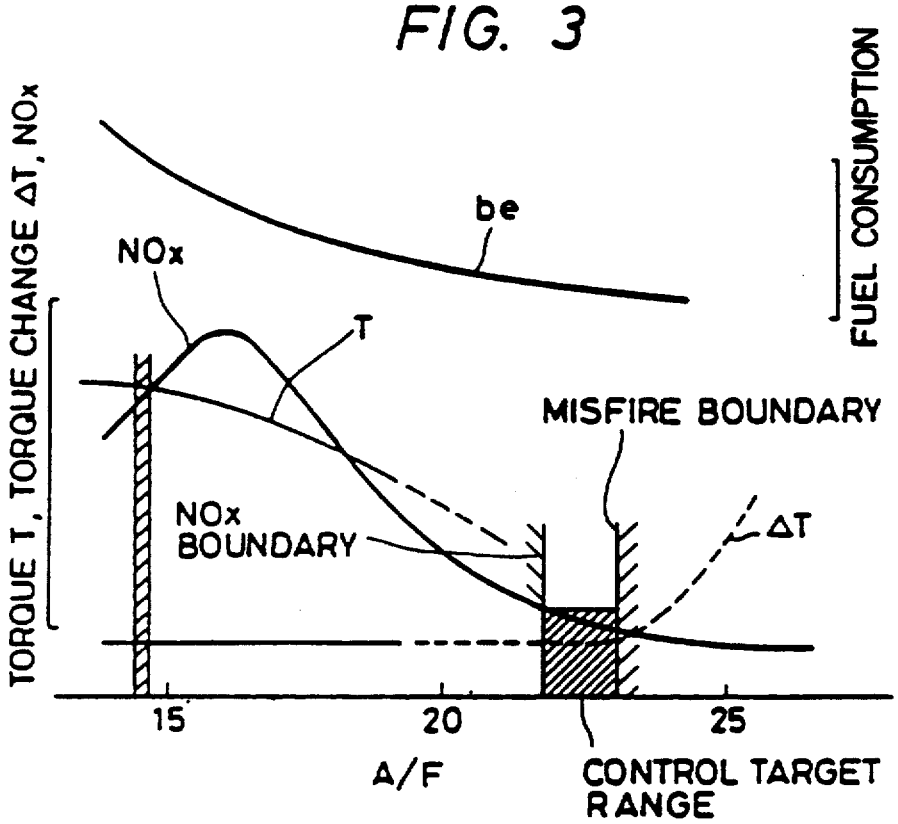
FIG. 3 is a graphical illustration showing the characteristics of air fuel ratio, torque and NOx.

In FIG. 2 showing an embodiment of a lean-burn control apparatus, the apparatus comprises a misfire detector 7 for detecting the misfiring state of an engine 6, a NOx detector 8 for outputting a signal corresponding to the concentration of NOx which is produced by or exhausted from the engine 6, and a digital arithmetic unit 9 of a microcomputer for inputting the signals of these detectors 7 and 8. In addition to these signals, the air fuel ratio A/F signal of an air fuel mixture supplied to the engine 6 and the ignition timing Adv signal are inputted to the digital arithmetic unit 5. Based on these items of information, the digital arithmetic unit 9 selects the ordinary operational mode 10 or the correcting operational mode 11 in accordance with the control flow shown in FIG. 1. The selected operational mode is executed, and a control signal is outputted to the ignition timing control means 12 and the fuel amount or air amount control means 13 so as to control the Adv and the A/F.

The above-mentioned method will be further explained referring to FIG. 4. If the misfire boundary is taken into consideration, the target control range must be on the left-hand side of the misfire boundary in FIG. 4, while if the NOx limit is taken into consideration, the target control range must be on the right-hand side of the NOx limit in FIG. 4. Therefore, if both are taken into consideration, the target control range must be set at the range surrounded by the misfire boundary and the NOx limit. Assuming that the misfire detector detects the misfiring state of the engine, and the A/F and Adv values at this state indicate point $P_1$, the A/F is so controlled as to move in the direction of Rich and be situated at point $P_2$, thereby canceling the misfiring state. If the detected value of NOx is smaller than a tolerance limit of the NOx limit, it is judged to be controlled within the target control range.

On the other hand, if the signals are, for example, at point $P_3$ at which the detected value of NOx is beyond the tolerance limit, the A/F is so controlled as to move in the direction of Lean and be situated at point $P_4$ at which the NOx is in the tolerance limit. In this case, if the signal detected by the misfire detector is judged to be a non-misfiring state, the misfire and NOx signals are considered to have been moved to the target control range, and the correction control is stopped at that stage.

If the misfire and NOx signals are at, for example, point $P_5$ at which the detected value of the NOx detector is beyond the tolerance limit, the A/F is so controlled as to move in the direction of Lean and be situated at point $P_6$ at which the NOx is in the tolerance limit in the same way as in the case of $P_1$. In this case, however, since the misfire detector judges the engine to be in the misfiring state, both conditions cannot be satisfied. In this case, it is necessary to temporarily return to point $P_5$ and control the A/F so as to move in the direction of Lean and in the direction in which the ignition timing Adv is [delayed] *retarded* and to reach point $P_7$, or to control the A/F and Adv so that the misfire and NOx signals move from point $P_6$ to point $P_7$.

If the signals are at, for example, point $P_8$ at which the NOx is within the tolerance limit but the misfire signal is judged to be beyond the misfire boundary, the A/F is made richer so as to reach the point $P_9$, thereby escaping from the misfire boundary. However, since the NOx is beyond the tolerance boundary at point $P_9$, it is necessary to temporarily return to the point $P_8$ so as to advance the ignition timing Adv by a predetermined value and simultaneously to make the A/F richer so as to reach point $P_{10}$, thereby satisfying the conditions of both misfire and NOx. Alternatively, a control from $P_9$ to $P_{10}$ is possible, as described above.

Figure 5:
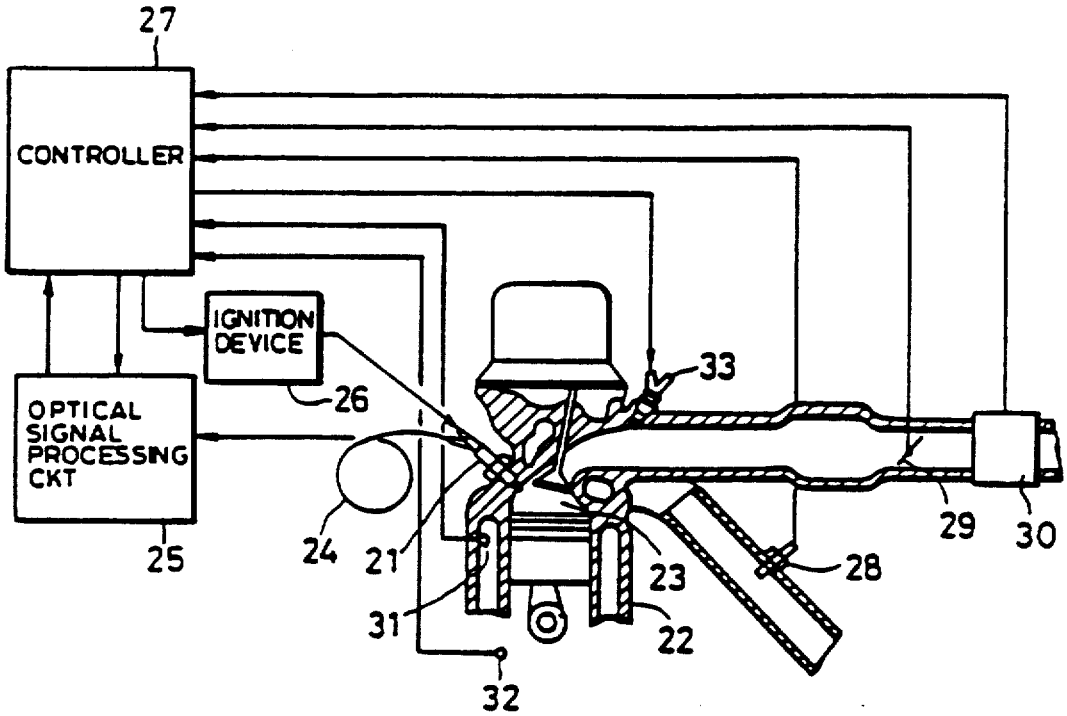
FIG. 5 is a schematic diagram of an engine control system according to an embodiment of the invention.

FIG. 5 shows the total structure of the lean-burn control apparatus according to the present invention. In FIG. 5, a combustion sensor having a function of detecting the misfiring state of an engine and the concentration of NOx comprises a combustion detecting terminal 21 mounted on a combustion chamber 23 of the engine 22 in such a manner as to communicate with the combustion chamber 23, an optical fiber cable *24* for carrying out optical transmission between the combustion detecting terminal 21 and an optical signal processing circuit 25 [and the optical signal processing circuit 25].

Figure 6:
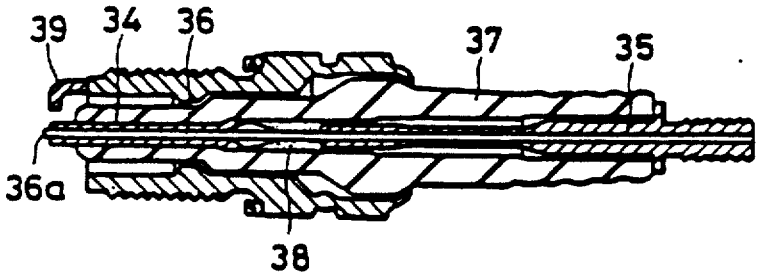
FIGS. 6 and 7 each are a sectional view of a combustion light sensor.
Figure 7:
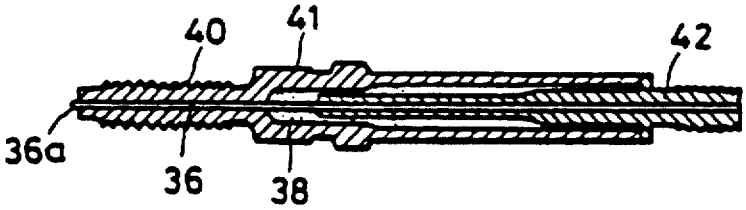

The combustion detecting terminal 21 may be either integrally provided with an ignition plug, as shown in FIG. 6, or of a stand-alone type, as shown in FIG. 7. In FIG. 5, the former type of detection terminal is mounted on the apparatus. In this case, an ignition pulse is provided for the combustion detecting terminal 21 by a controller 27 having a built-in microcomputer through an ignition device 26, so that the combustion detecting terminal also has a function of an ignition plug.

A combustion light signal or combustion temperature signal which is subjected to photoelectric conversion and signal processing by the optical signal processing circuit 25 is introduced to the controller 27. To the controller 27, an air fuel ratio signal detected by an air fuel ratio sensor 28 (or oxygen sensor), a throttle valve opening degree information signal supplied from a throttle valve opening degree sensor or a throttle valve opening degree switch 29, an air flow rate signal detected by an air flow sensor 30, and an engine cooling water temperature signal detected by a water temperature sensor 31, an engine revolution number signal and a crank angle signal detected by a revolution sensor 32, etc. are also inputted.

The controller 27 determines the optimum fuel amount and the optimum ignition timing by the arithmetic processing of these plural signals, and outputs a control signal to both an injector 33 and the ignition device 26. The injector 33 injects the optimum amount of fuel to supply it to the engine in accordance with the control signal. The ignition device 26 discharges sparks to the ignition plug 21 at the optimum ignition timing.

In FIG. 5, the multi-point fuel injection system is adopted, but the present invention is not restricted thereto, and any system such as a carburetor and a single-point fuel injection system may be adopted. Although the air flow rate direct measuring system using the air flow sensor 30 is adopted in FIG. 5, any other air flow rate measuring system may be adopted such as a speed density system for calculating the air flow rate from the revolution number of the engine and the suction negative pressure and a system for calculating the air flow rate from the revolution number of the engine and the opening degree of the throttle valve.

FIG. 6 is a sectional view of the main part of the fuel detecting terminal of a type in which it is integrally provided with an ignition plug. A fused silica fiber 36 having a diameter of about 1.0 to 1.5 mm, which is a photoconductive material, is provided therein in such a manner as to pass through a central axis of a central electrode 34 of the ignition plug and a high-voltage terminal 35. An insulator 37 is secured to these three members 34, 35 and 36 at a sealed portion 38 by heat sealing of a conductive glass sealing material. A high voltage for spark discharge is introduced to the central electrode 34 through the high-voltage terminal 35 and the conductive glass sealed portion 38 to carry out spark discharge with a grounding electrode 39. The configuration of the end portion 36a of the fused silica fiber on the combustion chamber side may be the optimum configuration selected from among a convex lens, a flat shape, a tapered shape and the like in accordance with the configuration of the combustion chamber, the angle at which the combustion detecting terminal 21 is provided and the like.

FIG. 7 is a sectional view of the main part of the stand-along type combustion detecting terminal. The combustion detecting terminal is provided with a metal housing 41 having a screw portion 40 for mounting the combustion detecting terminal to an engine, and the fused silica fiber 36 provided in such a manner as to go through a central axis of an optical fiber guide terminal 42. These three members 41, 36 and 42 are secured to each other at the sealed portion 38 by heat sealing of a glass sealing material, in the same way as in FIG. 6. Additionally, although explanation of the sealing material is omitted in FIG. 6, a material having a melting point of about 600° to 800° C. is used as the sealing material so as to secure adequate sealing property and adherence even at a high temperature due to heat conduction or radiation from the engine. The end portion 36a of the fused silica fiber has a similar structure to that in FIG. 6, explanation thereof being omitted herein.

In a conventional method of detecting misfire, it is generally inferred from the magnitude of a revolution change of an engine. In the present invention, however, a method of detecting misfire from the intensity of the combustion flame light or the combustion temperature at the time of combustion is adopted.

In the present invention, the concentration of NOx is obtained from the combustion temperature by utilizing the fact that there is a corresponding relationship between the combustion temperature in the combustion chamber and the concentration of NOx. As another method, a method of obtaining the concentration of NOx from the intensity of the combustion light at the wavelength of 5.3 μm is adopted by utilizing the fact that the emission spectrum of NOx is 5.3 μm. Alternatively, a method of inferring the concentration of NOx from the temperature of the exhaust gas immediately after the combustion chamber is effective, because the temperature of this exhaust gas substantially corresponds to the combustion temperature.

The above-described methods of detecting misfire and NOx will be summed up as follows:

(1) A method of detecting misfire and NOx from the intensity of the combustion light.

(2) A method of obtaining misfire and NOx by detecting the combustion temperature.

The method (1) of detecting misfire and NOx from the intensity of the combustion light will first be explained. In this case, the end portion 36a of the combustion detecting terminal 21 is so designed as to secure sufficient light transmission by polishing the surface or the like, as shown in FIGS. 6 and 7.

Figure 8:
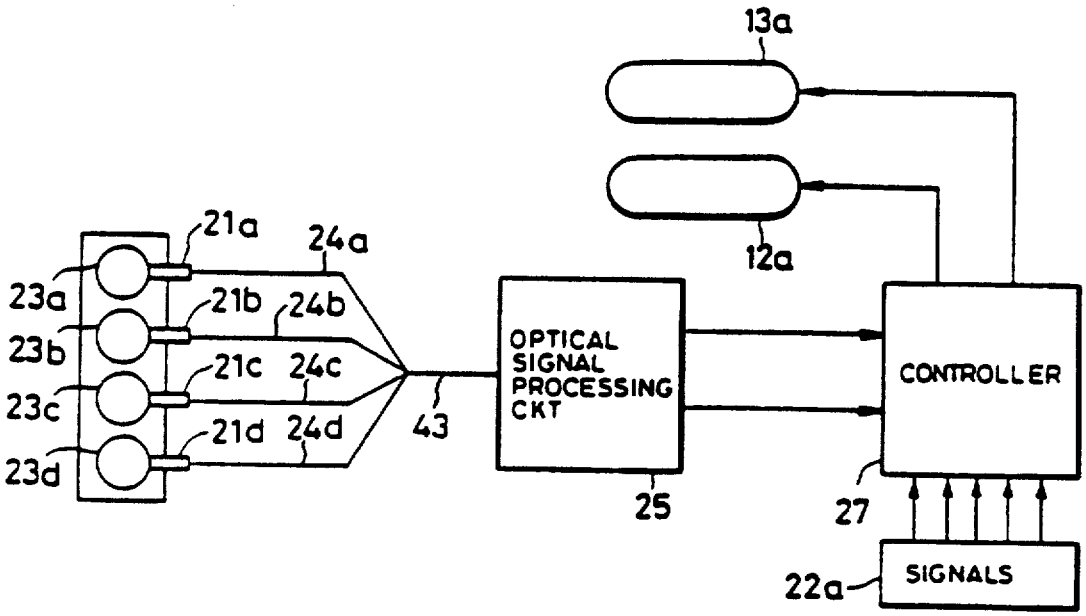
FIG. 8 is a schematic diagram showing the detailed structure of the present invention.

FIG. 8 schematically shows the structure of the transmission and processing of an optical signal in this case. The combustion light detecting terminal 21 is mounted on each of the combustion chambers 23a to 23d in a manner as shown in FIG. 5. The present invention also allows a system for detecting only one specified chamber. The optical signals from the combustion light detecting terminals 21a, 21b, 21c and 21d are introduced to the optical signal processing circuit 25 through the respective optical fiber cables 24a, 24b, 24c and 24d. As the optical fiber cable 24, a high heat-resistant plastic fiber which can resist a temperature above about 140° to 150° C. is preferable. A plastic fiber facilitates the formation of an integrated single-core fiber 43 which is composed by melting the plural fibers into one fiber, as shown in FIG. 8. The power or combustion stroke of a four-cycle engine is one cycle of the four cycles. In the case of a four-cylinder (combustion chamber) engine, the power stroke in each combustion chamber is subsequently repeated at every 180 degrees. In the case of a six-cylinder engine, it is repeated at every 120 degrees, and the overlap of the power stroke between each chamber is as small as 60 degrees. Therefore, even if the single-core fiber 43 is used, it is easy to discriminate an optical signal from one cylinder (combustion chamber) from an optical signal from another cylinder, because the optical signal from each combustion chamber is introduced to the optical signal processing circuit 25 intermittently with almost no overlapping. It goes without saying that light may be transmitted from each cylinder through optically separate fibers without integrating the fibers.

Figure 9:
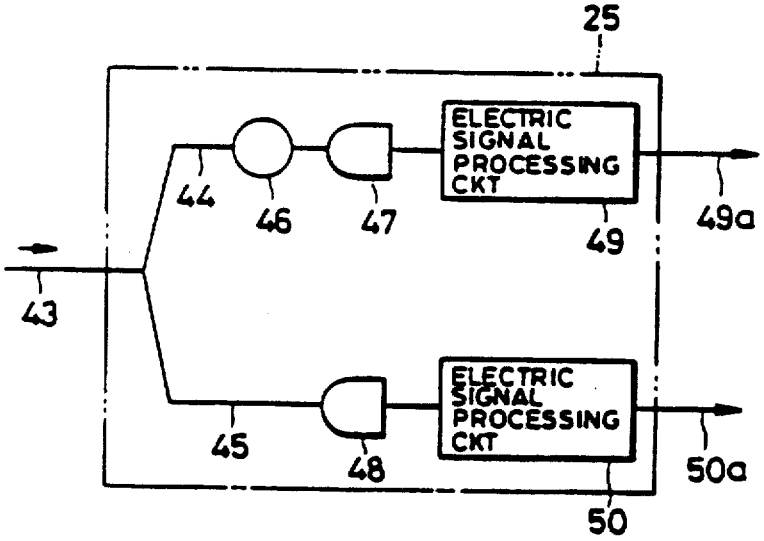
FIG. 9 is a schematic diagram showing a part of the structure shown in FIG. 8.

FIG. 9 shows the structure of the optical signal processing circuit 25. The combustion light introduced by the single-core fiber 43 is divided here again into two parts, and introduced to a fiber 44 for NOx concentration detection and a fiber 45 for misfire cycle detection. The light for detecting the concentration of NOx is introduced to a first photoelectric transducer 47 through an optical filter 46 which only transmits the light of a wavelength of 5.3 μm. The light intensity corresponding to the concentration of NOx is detected and is converted into electricity. On the other hand, the light for detecting misfire is directly introduced to a second photoelectric transducer 48 and is converted into electricity. The electrically converted signals are processed by electric signal processing circuits 49 and 50 to output electric signals 49a, 50a which are supplied to a controller 27. In the case of this system, since it is necessary to transmit the light of a wavelength of 5.3 μm in the infrared spectral range, there is a possibility of a photoconductive material such as the above-described plastic fiber not introducing sufficient light to the optical signal processing circuit 25 due to large transmission loss. In this case, a fluorine optical fiber which is excellent in transmission to light in the infrared spectral range is used. When it is impossible to melt a plurality of fibers into one fiber unlike a plastic fiber, they are integrated into one by an optical element at the optical signal processing circuit, or a photoelectric transducer is provided in correspondence with each cylinder (combustion chamber).

The misfire signal and the NOx signal obtained in this way are introduced to the controller 27, as shown in FIG. 8, and computed together with a plurality of other engine parameter signals 22a, whereby the air fuel ratio control 13a and the ignition timing control 12a are effected.

Figure 10:
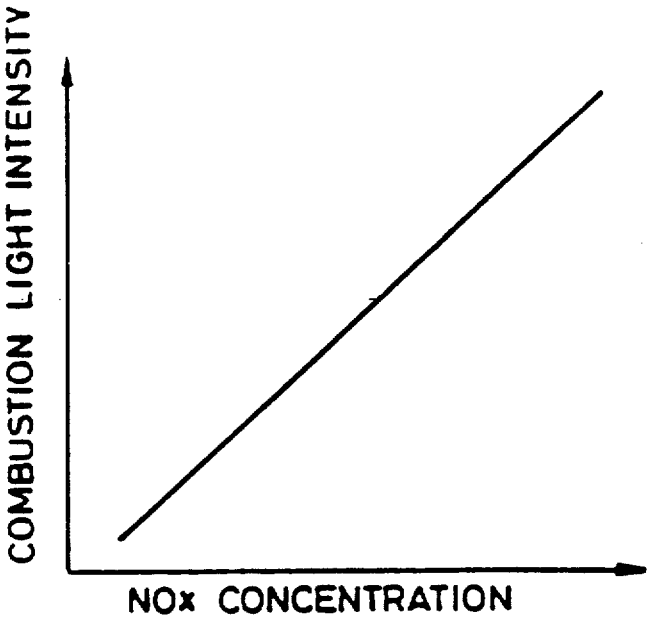
FIG. 10 is a graphical illustration showing a relationship between combustion light intensity and NOx concentration.

FIG. 10 shows a relationship between the concentration of NOx and the combustion light intensity signal in the 5.3 μm zone in the case of adopting the system shown in FIGS. 8 and 9. Since they have substantially proportional relationship, an electric signal output from the signal output end 49a in FIG. 9 takes the value substantially corresponding to the concentration of NOx.

Figure 11:
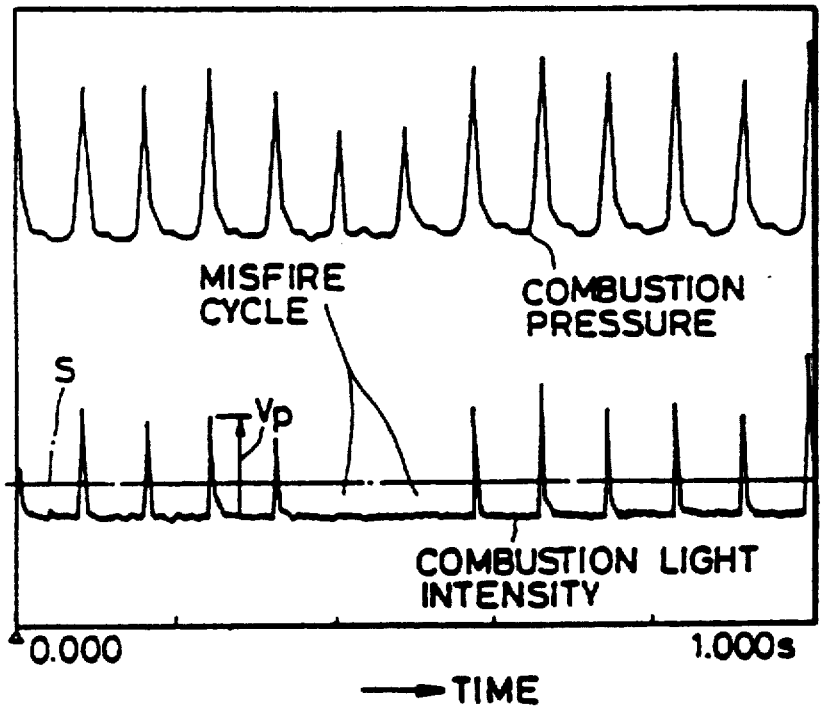
FIG. 11 is a graphical illustration showing characteristics of combustion pressure and combustion light intensity.

FIG. 11 shows an example of the waveform of a misfiring state detected by the system shown in FIGS. 8 and 9. The electric signal of the intensity of the combustion light and the combustion pressure signal output from the signal output end 50a in FIG. 9 are detected at the same time for judging misfire. As is obvious from FIG. 11, when the engine is misfired, the intensity of the combustion light becomes zero, thereby producing no waveform, while the combustion pressure is only composed of the compression pressure, and no rise in the pressure following combustion is observed. Therefore, a slicing level S is provided as indicated by the symbol S in FIG. 11, and if the signal has a value lower than this value, the engine is judged to be in a misfiring state, and signal pulse corresponding to this misfire cycle is produced and transmitted to the controller 27. Thus, the misfire information is consecutively transmitted to the controller.

Figure 12:
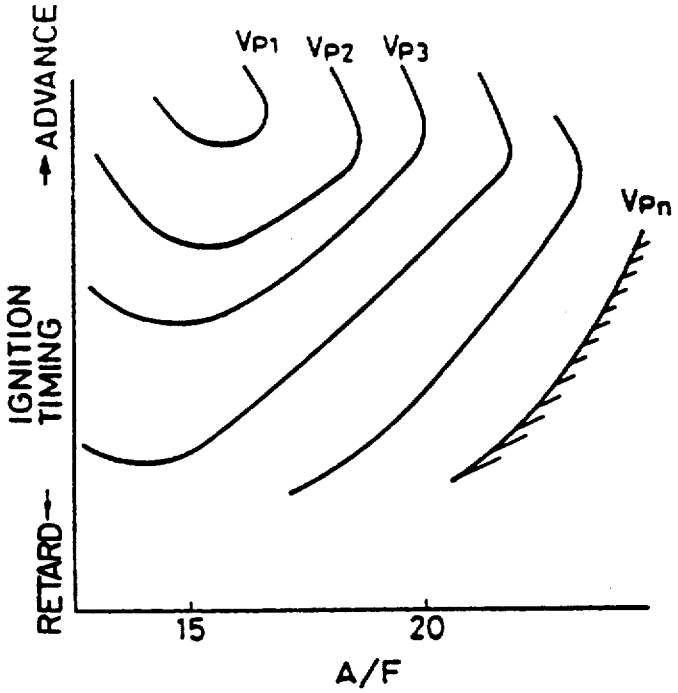
FIG. 12 is a graphical illustration showing relationship between ignition timing and air fuel ratio.

FIG. 12 shows the average value of the peak values $V_p$ for several cycles of the combustion light intensity signals shown in FIG. 11 with respect to the air fuel ratio and the ignition timing represented by a contour line. The smaller the subscript is, like $V_{pl}$, the larger the peak value, and $V_{pn}$ is the smallest. As is clear [form] *from* FIG. 12, the contour line of $V_p$ has a configuration well corresponding to the curve of the misfire boundary in FIG. 4, and judgement as to misfire also may be made by using the average value $V_p$ for several cycles.

Figure 13:
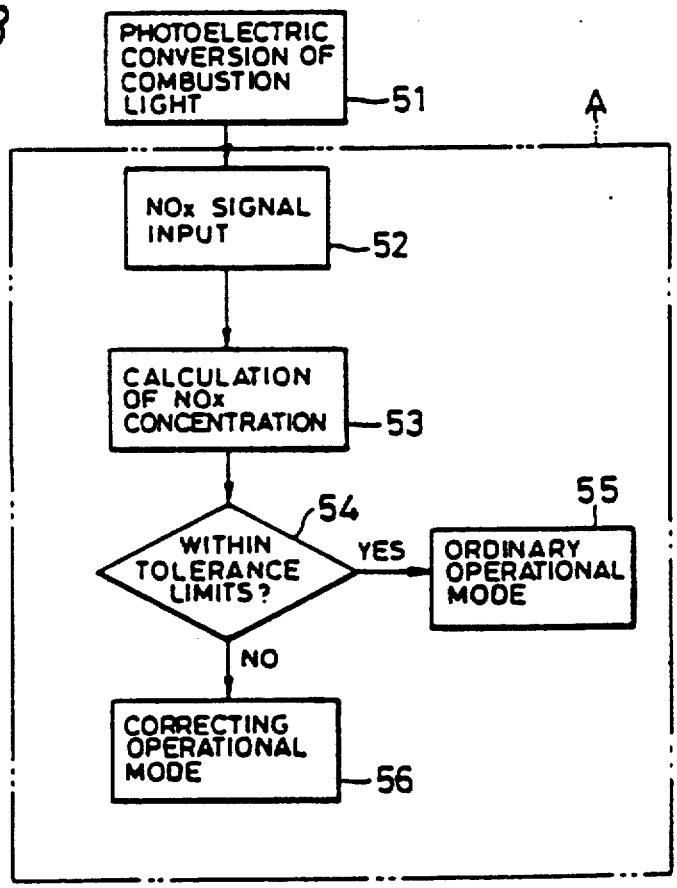
FIG. 13 is a detailed flow chart of part of the above embodiment.

FIG. 13 is a flow chart for judging the tolerance limit of NOx. At step 51, the signal is photoelectrically converted into an electric signal through the photoelectric transducer 47 and the electric signal processing circuit 49 shown in FIG. 9, and the electric signal input as a NOx signal to the controller 27 at step 52. The concentration of NOx is calculated at the step 53 according to the characteristics shown in FIG. 10. In this case, it is preferable to obtain the average value for several [ten] *tens of* power cycles. At step 54, the tolerance value (value satisfying the right-hand side range of the NOx limit line of FIG. 4) is compared with the NOx value calculated at the step 53 and judgement is made as to whether or not the calculated NOx value is in the range of the tolerance limit. If the answer is yes, the process proceeds to step 55 for the ordinary operational mode, while if the answer is no, the process proceeds to step 56 for the collecting operational mode and various controls are executed.

Figure 14:
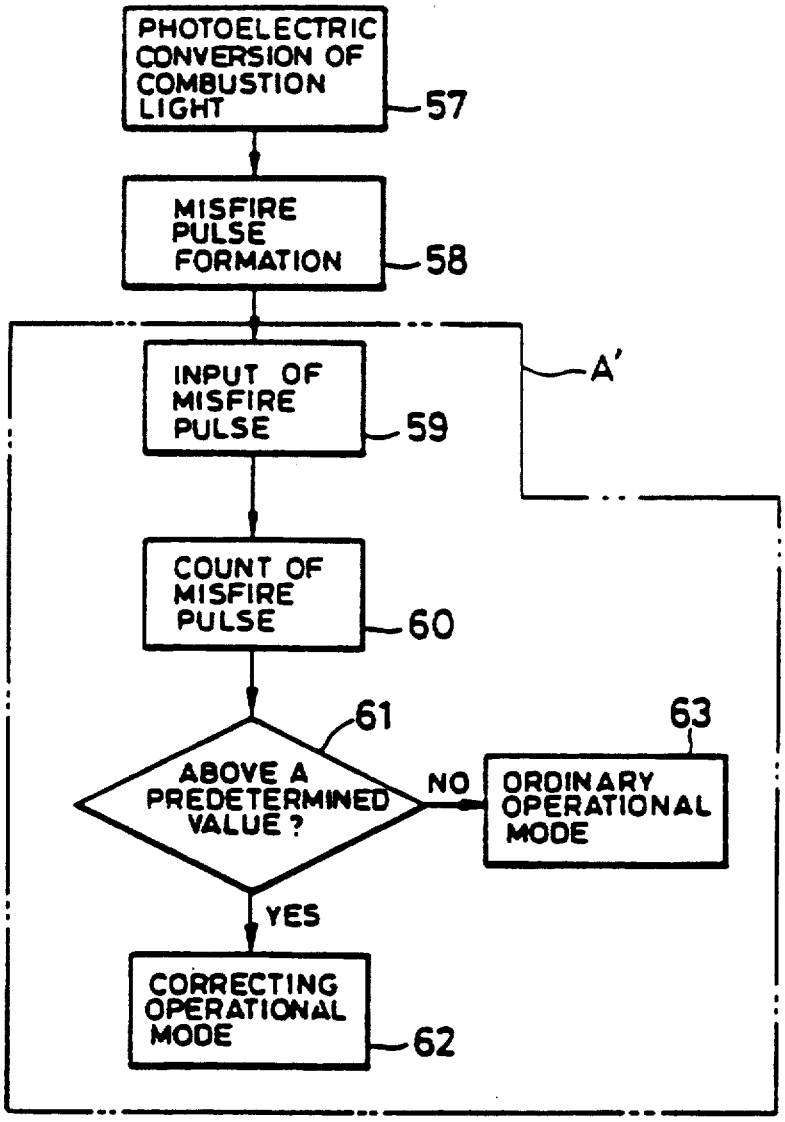
FIG. 14 is a detailed flow chart of part of the above embodiment.

FIG. 14 is a flow chart for judging a misfiring state. The combustion light intensity signal is photoelectrically converted through the photoelectric transducer 48 and the electric signal processing circuit 50 in FIG. 9 at step 57 and a misfire pulse is produced at the electric signal processing circuit 50 at step 58. More specifically, the waveform of the combustion light intensity signal as shown in FIG. 11 is input at the step 58, and judgement is made as to whether the peak value of the waveform of the combustion light intensity signal produced in each power cycle is larger or smaller than a predetermined slicing level S as shown in FIG. 11. If the peak value is larger than S, the cycle is judged to be misfire, and a misfire pulse is produced and outputted for a predetermined period in the corresponding cycle.

The misfire pulses obtained in this way are inputted to the controller 27 at step 59. The misfire pulses produced at the step 59 are counted for a predetermined number of times of power cycles at the step 60 and the count value is supplied to step 61. At the step 61, whether or not the count value is above a predetermined value is judged, and if the answer is yes, the process proceeds to the correcting operational mode 62, while if the answer is no, the process proceeds to the ordinary operational mode 63.

The portion A in FIG. 13 and the portion A' in FIG. 14 are executed by the controller 27.

FIG. 15 is a flow chart integrating the portions A and A' and showing the details of the correcting operational mode.

At step 64, the signals of the engine revolution number $N_E$ and the air flow rate $Q_A$ (or load information such as the pressure of the intake pipe and the opening degree of the throttle valve) are inputted to the controller 27 and further at step 65, signals of air fuel ratio A/F (the value is represented by X) and ignition timing Adv (the value is represented by Y) are inputted to the controller 27.

At step 66, the signal of the misfire pulses (M) produced at the electric signal processing circuit 50 in FIG. 9 and the signal of NOx (N) produced at the electric signal processing circuit 49 are inputted to the controller 27. The value of N is a waveform peak-held for each power cycle.

At step 67, the concentration of NOx is converted from the NOx signal (N) inputted at the step 66 by using the characteristics shown in FIG. 10. At this step, the thus-converted concentration values of NOx for given several ten power cycles are averaged to [calculated] *calculate* the average value $\overline{N}$. At step 68, judgement is made as to whether or not $\overline{N}$ is larger than the tolerance value of the concentration of NOx which is determined in advance in correspondence with the operational state of the engine which is, in turn, determined by the $N_E$ and the $Q_A$. If the answer is yes, the process proceeds to steps 69 and 70. If the answer is no, the process proceeds to steps 71 and 72.

On the other hand, the number of the misfire pulses M in a predetermined number of times of power cycles is counted at step 73, and the count value Mx is supplied to step 74, at which whether or not the count value Mx is smaller than a predetermined number is judged. If Mx is larger than the predetermined number, the process proceeds to the steps 72 and 71, while if Mx is smaller, the process proceeds to the steps 69 and 71. At the steps 69, 70, -70 and 72, operation is carried out only when signals are transmitted at the same time from two signal lines.

At the step 69, the processing is executed only when the NOx is out of the tolerance limit and misfire is within the tolerance limit. In other words, the operation is carried out in the case where the signals are situated at the points such as $P_3$, $P_5$ and $P_9$ in FIG. 4. In this case, the air fuel ratio is increased so as to be lean by a predetermined value in the form of $X=X+1$, and the control signal is transmitted to A/F correction control step 75. At the step 75, the amount of air or fuel is controlled by this control signal, and the mixture having a leaner air fuel ratio than that at the previous time is supplied to the engine. In the case of, for example, $P_3$ in FIG. 4, this mode is repeated so as to move the NOx signal and misfire signal to the target control range, for example, to the point $P_4$, which satisfies both conditions, and thereafter the process proceeds to step 71 for the ordinary operational mode. In the case of, for example, $P_5$ and $P_9$, if the mode through the step 69 is repeated, the signals enter the range, for example, to the points $P_6$ and $P_8$, in which NOx is in the tolerance limit but misfire exceeds the tolerance value. This state is treated at the step 72. At the step 72, the deviation $\Delta Y$ of the ignition timing Y at the current time from the preset ignition timing $Y_0$ which has been set in advance in correspondence with the operational state of the engine is taken as $\Delta Y=Y-Y_0$, and at step 76 judgement is made as to whether or not $\Delta Y$ is positive, in other words, ahead of the preset ignition timing. If $\Delta Y$ is positive, namely, if the signals are situated, for example, at the point $P_6$ in FIG. 4, the air fuel ratio is set on the Rich side in the form of $X=X-0.5$ at step 77, and the signal is supplied to the step 75, thereby executing the A/F correction control. In parallel to this, the process proceeds to step 78, and the ignition timing is set on the delay side in the form of $Y=Y-1$, and the signal is transmitted to step 79, thereby executing the Adv correction control so that the state of $P_6$ comes to the state as indicated by the point $P_7$.

On the other hand, if $\Delta Y$ is negative, and the state is as indicated by $P_8$, the process proceeds to step 80, wherein the air fuel ratio is set on the Rich side in the form of $X=X-0.5$, and the signal is transmitted to the step 75 so as to execute A/F correction control. At the same time, the ignition timing is set on the advanced side in the form of $Y=Y+1$ at the step 81, and the signal is transmitted to the step 79 so as to execute Adv correction control, whereby the state of $P_8$ comes to the state as indicated by the point $P_{10}$.

If both NOx and misfire take values beyond the respective tolerance values, the process proceeds to the step 70, and the deviation of the ignition timing is obtained in the form of $\Delta Y=Y-Y_0$. Whether or not $\Delta Y$ is positive is judged at step 82. If $\Delta Y$ is positive, namely, if the state such as that indicated by the point $P_{11}$ in FIG. 4 is assumed, the air fuel ratio is set at a little richer side than at $P_1$, in the form of $X=X-0.1$ at step 83, and the signal is transmitted to the step 75 so as to execute A/F correction control. Simultaneously, the ignition timing is set [at a little largely delayed side] *a little bit larger on the retarded side with respect* to the present timing in the form of $Y=Y-1.5$ at step 84, and the signal is transmitted to the step 79 to execute Adv correction control so that the point $P_{11}$ falls within the target control range. On the other hand, if $\Delta Y$ is negative, namely, if the state such as that indicated by the point $P_{12}$ in FIG. 4 is assumed, the process proceeds to step 85, and the air fuel ratio is set at a little leaner side than at $P_{12}$ in the form of $X=X+0.2$, and the signal is transmitted to the step 75 so as to execute A/F correction control. Simultaneously, the ignition timing is set at a largely advanced side in the form of $Y=Y+1.5$ at step 86, and the signal is transmitted to the step 79 so as to execute Adv correction control so that the state of $P_{12}$ comes into the target control range.

In the above A/F $X=x+1$, $X-0.1$ . . . and Adv $Y=Y+1.5$, $Y-1$, etc., the numeral "1", "0.5", "1.5", etc. represent control gains each obtained by once control, for example, "1" is 10% of X, or Y, "0.5" is 5% of X or Y.

It is effective to add the controller 27 a function of storing A/F and Adv in a map table made from the $N_E$ and the $Q_A$ when A/F and Adv are moved to the target control range in this way and renewing these values when new A/F and Adv are obtained by executing similar control at the preceding cycle. It is also effective to obtain the misfire boundary line and NOx limit line by the repetition of the above-described controls and store these lines on the map table of A/F and Adv.

The method (2), namely, the method of detecting and controlling misfire and NOx from the detected combustion temperature will now be explained.

Figure 16:
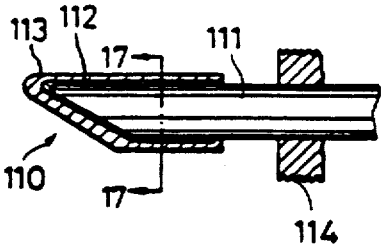
FIG. 16 is a sectional view of a black body sensor.
Figure 17:
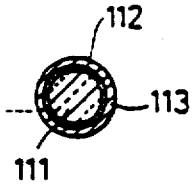
FIG. 17 is a sectional view taken along a line 17—17 of FIG. 16.
Figure 18:
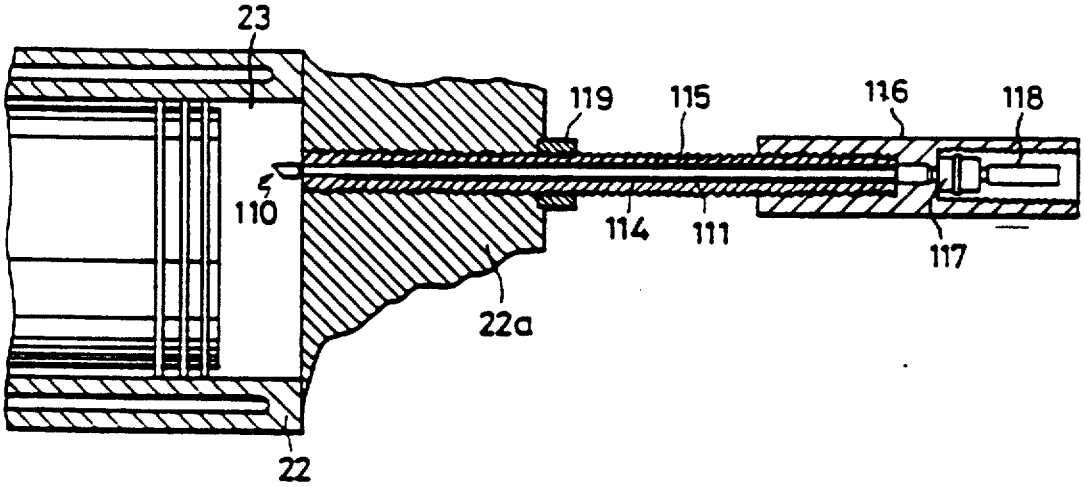
FIG. 18 is a sectional view of parts of an engine and a black body sensor.

FIGS. 16 to 18 show in example of a detector 110 suitable for detecting combustion temperature which can be used for the combustion detecting terminal 21 used in the system shown in FIG. 5.

The detector 110 comprises an end portion of an optical transmission element 111 made of quartz (or fused silica fiber) having a diameter of about 1 mm and having a resistance to a temperature of 300° to 1,500° C. in the combustion chamber 23, and a thin black body film 112 of iridium having a linear expansion coefficient approximate to that of quartz and attached to the end portion of the optical transmission element 111. The end portion of the element 111 is obliquely cut to provide a large end surface for detecting spectral radiant energy. The black body film 112 is attached to the end so as to cover the end portion of the element including the cut surface. The black body film 112 is covered with a protective film 113 made of high heat-resistant material such as quartz and ceramic to prevent the black body film from being peeled from the element 111 and to prevent the deterioration of the black body film 112 due to oxidization and corrosion.

The black body film 112 is formed on the end portion of the element 111 by evaporation, sputtering or the like. The protective film 113 is also formed on the surface of the element 111 by evaporation, sputtering or the like. The protective film 113 is fused to the element 111 at an end thereof, so that it is firmly adhered to the element 111. A sapphire rod may be used in place of the element 111. The black body film 112 and the protective film 113 preferably have a thickness of as small as about 2 to 5 μm from the point of view of heat capacity. However, when a sufficient adhesion is not obtained, the thickness of those films is increased.

The temperature in the combustion chamber 23 of the engine 22 varies with a period of several KHz, and the pressure in the combustion chamber 23 rapidly changes, but the use of quartz as the optical transmission element 111 and iridium as the black body 112 realizes a firm structure having a good thermal response because quartz and iridium have good adhesion and approximately the same linear expansion coefficient.

In the detector 110 including a part of the optical transmission elements 111, it is also possible to use platinum, zirconium nitride or graphite as the black body 112, and, if measurement of a high temperature is necessary, to use sapphire as the optical transmission element.

As shown in FIG. 18, the detector 110 and part of the optical transmission element 111 is located in the combustion chamber 23 of an engine and secured to a wall portion 22a of the combustion chamber 23 by screwing.

More specifically, a metal pipe 114 is secured to the outer periphery of the optical transmission element 111 by a fused glass 115 and the outer periphery of the metal pipe 114 is threaded. A thread bore engaging the metal pipe 114 is formed on the wall 22a of the combustion chamber 23. The detector 110 and the optical transmission element 111 is screwed into and fixed on the wall 22a through the metal pipe 114.

To the projecting end of the pipe metal 114 which is fixed on the wall 22a of the combustion chamber 23 in this way, a connecting member 116 is secured by screwing. The connecting member 116 accommodates a connector 117 for connecting an optical fiber 118 to the optical transmission element 111. Therefore, when the connecting member 116 is connected to the projecting end of the metal pipe 114, the optical transmission element 111 and the optical fiber 118 are optically connected to each other.

By covering the outer periphery of the optical transmission element 111 with the metal pipe 114 through the fused glass 115, as described above, the pressure in the combustion chamber 23 of the engine is prevented from leaking to the outside.

Figure 19:
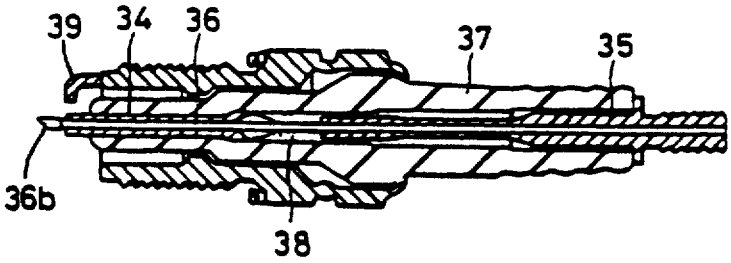
FIG. 19 is a sectional view of an ignition plug incorporated with a black body sensor.

Another example of the detector is of a plug type as shown in FIG. 19.

The detector portion 36b is an end of fused silica or quartz fiber 36 which is disposed in a central electrode 34. The other construction including a high voltage terminal 35, electrically insulating porcelain 37, a sealing 38 and a grounding electrode is the same as in FIG. 6.

The detector portion 36b is the same as in FIGS. 16 and 17. Namely, it comprises the fiber 36, a black body film adhered on a surface of and end portion of the fiber 36, and a protective film. The plug type detector has functions of detection of temperature and ignition of fuel air mixture in the combustion chamber.

Figure 20:
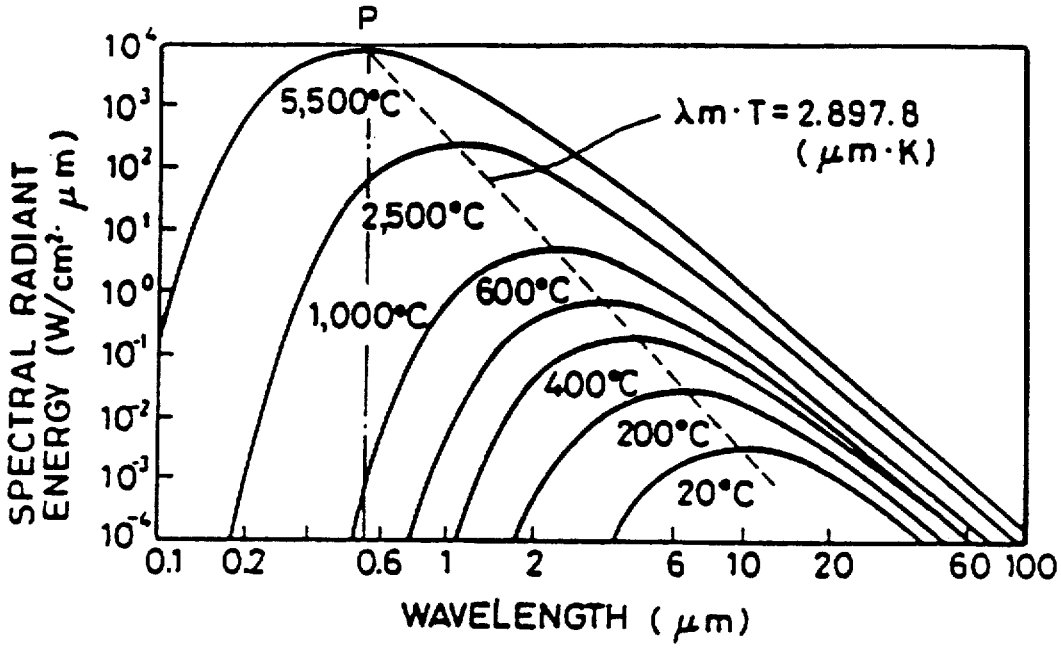
FIG. 20 is a graphical illustration showing a relationship between spectral radiant energy and wavelength.

It is known that a black body produces radiant energy to a temperature. FIG. 20 shows a relationship between the spectral radiant energy and wavelength and temperature of a black body. It is possible to infer the temperature by detecting the radiant energy with respect to a certain wavelength. For example, the temperature of 1,000° to [5,000° C.] *5,500° C.* is obtained by detecting the radiant energy at the wavelength of a point P in FIG. 20.

When the temperature of the black body film 112 shown in FIG. 16 rises due to combustion gas, in other words, when the combustion temperature changes, the radiant energy (radiant light) corresponding to the change is radiated from the black body film 112. By receiving the radiant energy the a photoelectric transducer through an optical filter (having a transmission to light of 550 nm in the case of the point P in FIG. 20), it is possible to obtain an electric signal corresponding to the combustion temperature.

Figure 21:
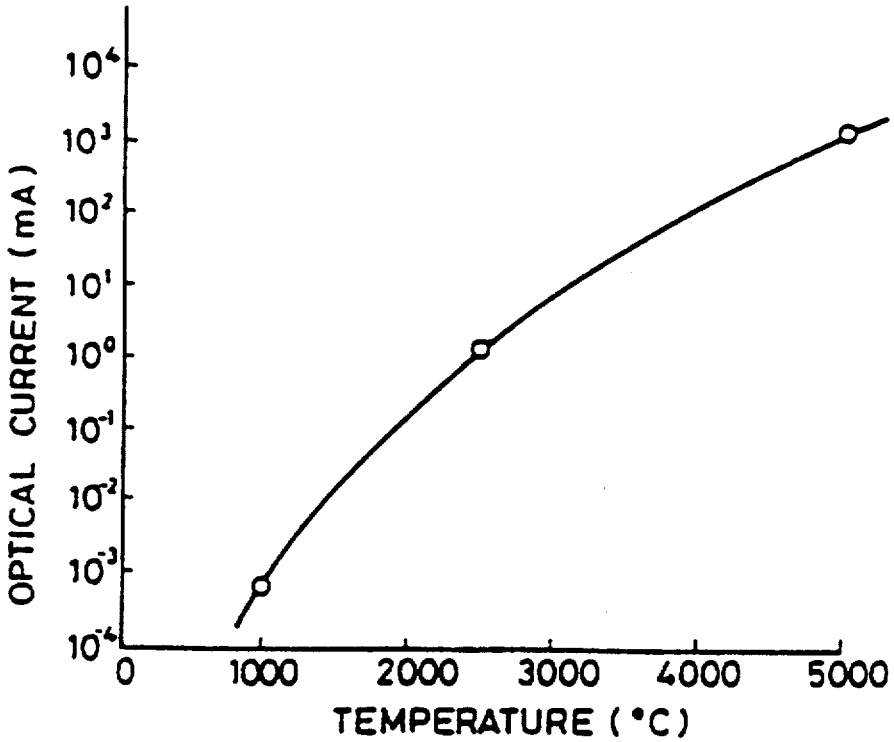
FIG. 21 is a graph showing a relationship between optical current and temperature.

FIG. 21 shows the characteristics of optical current with respect to the combustion temperature of a photoelectric transducer. The optical current changes on a log scale with respect to a change in temperature. Therefore, in the case of detection in a wide temperature range, a technique of logarithmically compressing the optical current through a log diode for linearization or the like is added.

Figure 22:
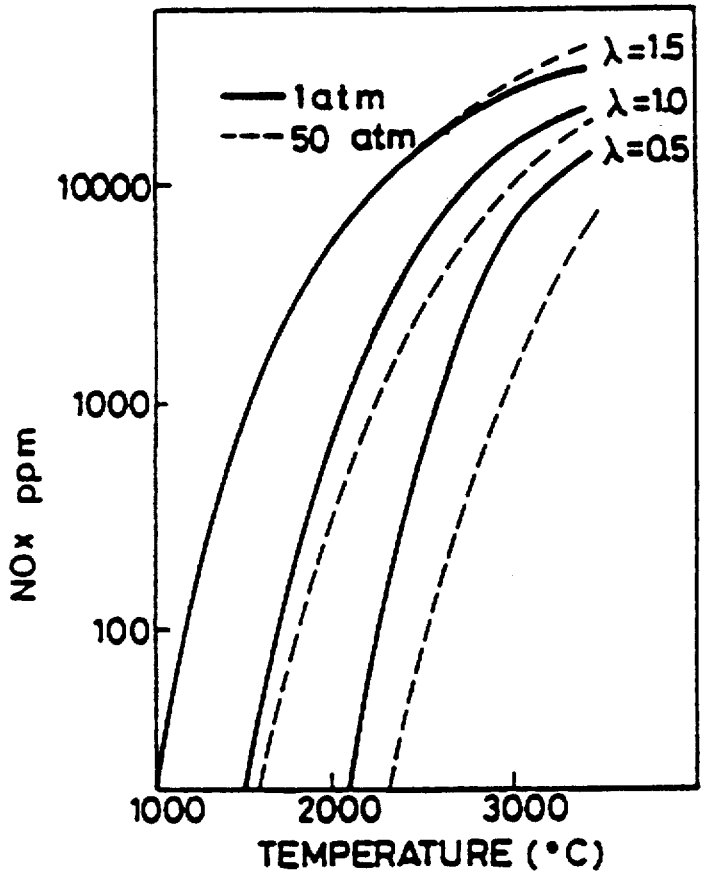
FIG. 22 is a graph showing a relationship between NOx and temperature.

FIG. 22 shows a relationship between combustion temperature and NOx. The higher the temperature is and the larger the ratio λ of excess air is, in other words, the larger and leaner the air fuel ratio A/F is, the higher is the concentration of NOx. However, there is little difference in the concentration of NOx between 1 atm and 50 atm in the pressure in the combustion chamber and it is understood that the influence of the pressure is negligible in an ordinary combustion state. Therefore, if the air fuel ratio is detected at a specified time, the concentration of NOx is easily calculated from the combustion temperature at that time. Since the value corresponding to the average air fuel ratio is detected by the air fuel ratio sensor 28, as shown in FIG. 5, if the combustion temperature is detected, it is possible to calculate the concentration of NOx.

Figure 23:
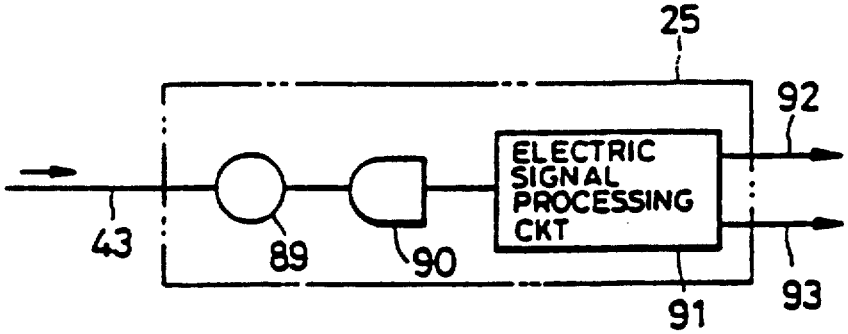
FIG. 23 is a block diagram of a processing circuit in another embodiment of a lean-burn control apparatus.

FIG. 23 shows the structure of the signal processing circuit 25 in the case of adopting the combustion temperature detecting system. The heat radiating light from the black body film 112 at the end portion 110 or 36b introduced by the single-core integrated fiber 43 is introduced to a photoelectric transducer 90 through an optical filter 89 which transmits only light of a specific wavelength (e.g., 700 nm). Since the intensity of the radiating light is a function of a temperature, information on the combustion temperature is obtained by photoelectric convention of the light intensity. In case of a misfire cycle, the combustion temperature naturally does not rise. Therefore, when the voltage of a signal is less than a predetermined voltage level, the cycle is judged to be a misfire cycle and the signal is passed through a comparator and a wave shaper, thereby outputting a misfire signal. Since the absolute value of the combustion temperature is substantially proportional to the concentration of NOx, it is possible to output a signal corresponding to the concentration of NOx from the peak value or the integrated value of the photoelectrically converted electric signal. These processings are carried out by an electric signal processing circuit 91.

The electric signal processing circuit 91 forms the waveforms of the combustion temperature signals for the respective cycles which are substantially equal to the waveforms of the combustion temperature signals shown in FIG. 11 by utilizing the characteristics shown in FIGS. 20 and 21. A given slicing level is set by utilizing the fact that the combustion temperature does not rise at the time of misfire, and when the combustion temperature signal in a power cycle does not exceed the slicing level, one misfire pulse is produced in that power cycle and the signal is output from an output end 92. From an output end 93, the peak value of the combustion signal which is peak held at each power cycle is output.

Figure 24:
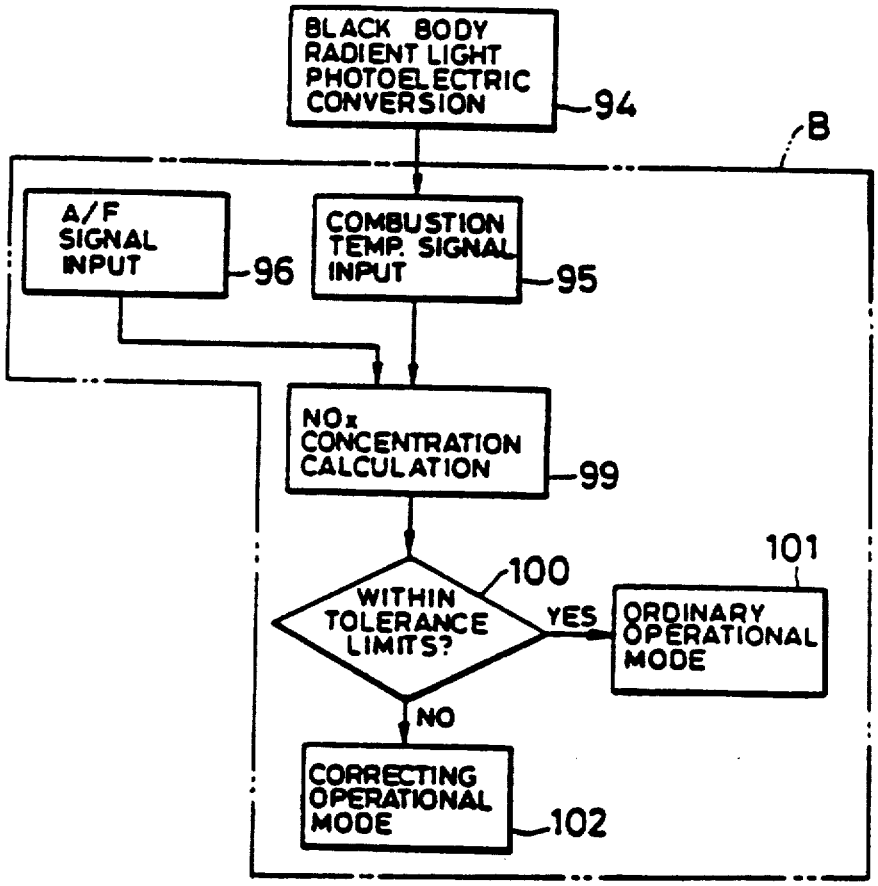
FIG. 24 is a detailed flow chart.

FIG. 24 is a flow chart for judging the tolerance limit of NOx. The signal photoelectrically converted by the photoelectric transducer 90 and peak held at each power cycle by the electric signal processing circuit 91 in FIG. 23 (at step 94) is transmitted to the controller 27 and inputted as a combustion temperature signal at step 95.

At step 96, an air fuel ratio signal is inputted from the air fuel ratio sensor 28 shown in FIG. 5. At step 99, the concentration of NOx is calculated from the combustion temperature by using the characteristics curve of NOx with respect to the air fuel ratio (ratio of excess air) such as that shown in FIG. 22. The average value of the concentrations of NOx for ten cycles is further calculated, and the result is supplied to step 100 as an average NOx value. At the step 100, the tolerance value of NOx value are compared with each other to judge whether or not the average value is within the tolerance limit. If yes, the process proceeds to ordinary operational mode 101, while if no, the process proceeds to the correcting operational mode 102 and the same control as that in FIG. 15 is carried out.

Figure 25:
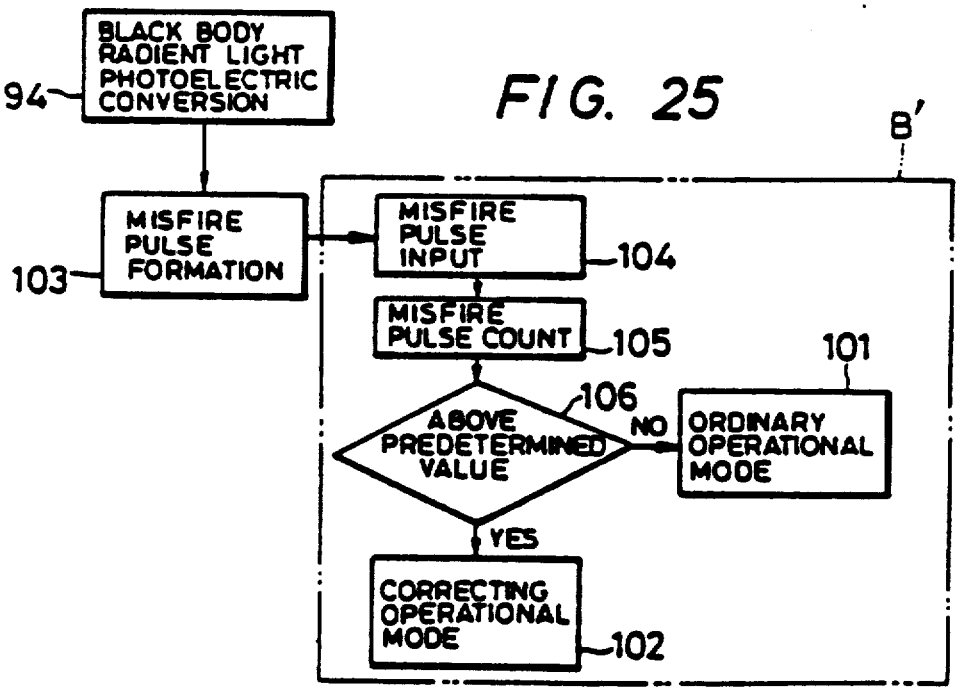
FIG. 25 is a detailed flow chart.

FIG. 25 is a flow chart for judging a misfiring state. The misfire pulse obtained by photoelectrically converting a signal by the photoelectric transducer 90 (at the step 94) and produced by the electric signal processing circuit 91 (at the step 103) in FIG. 23 is transmitted to the controller 27 and inputted as a misfire pulse at step 104. At step 105, the number of the misfire pulses is counted for a predetermined power cycles, and judgment is made as to whether or not the value is above a preset value. If the value is less than the preset value, the combustion state is judged to be a non-misfiring state, and the process proceeds to the step 101. On the other hand, if the value is above the preset value, the state is judged to be a misfiring state, and the process proceeds to the step 102, and the same control as that in FIG. 24 and the portion B' in FIG. 25 are carried out by the controller 27.

Since the details of the control flow at the portions B and B' are the same as those in FIG. 15, explanation thereof will be omitted.

An engine control system employing the abovementioned temperature detector such as the detector disclosed in FIGS. 16 to 19 is capable of a precise and effective control of an internal combustion engine because the sensor directly detects the temperature in the combustion chamber of the engine.

Such engine control apparatus is applicable to a knock control of the engine. An example, of the knock control will be described hereunder, referring to FIGS. 26 to 27.

Figure 37:
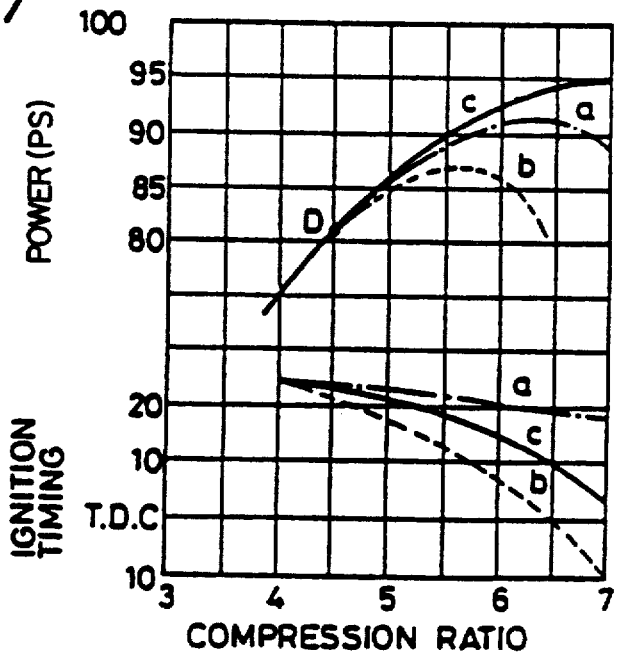
FIG. 37 is a graph showing a relationship between the compression ratio and the [output] *power* of an engine, and a relationship between the compression ratio and the ignition timing with respect to a knocking state a, no knocking state b and a trace knock state c.

In an internal combustion engine, there may appear three kinds of engine combustion states with respect to knock, that is, no knock state, a knock state and a trace knock state, which are shown by (a), (b) and (c) in FIG. 37 respectively. The optimum knock state is of a trace knock from a view point of engine power output. The knock state or strength, can be changed by changing ignition timing.

Occurrence of the knock influences change in temperature in the combustion chamber, so that the knock strength can be detected through detection of the temperature in the combustion chamber.

Figure 26:
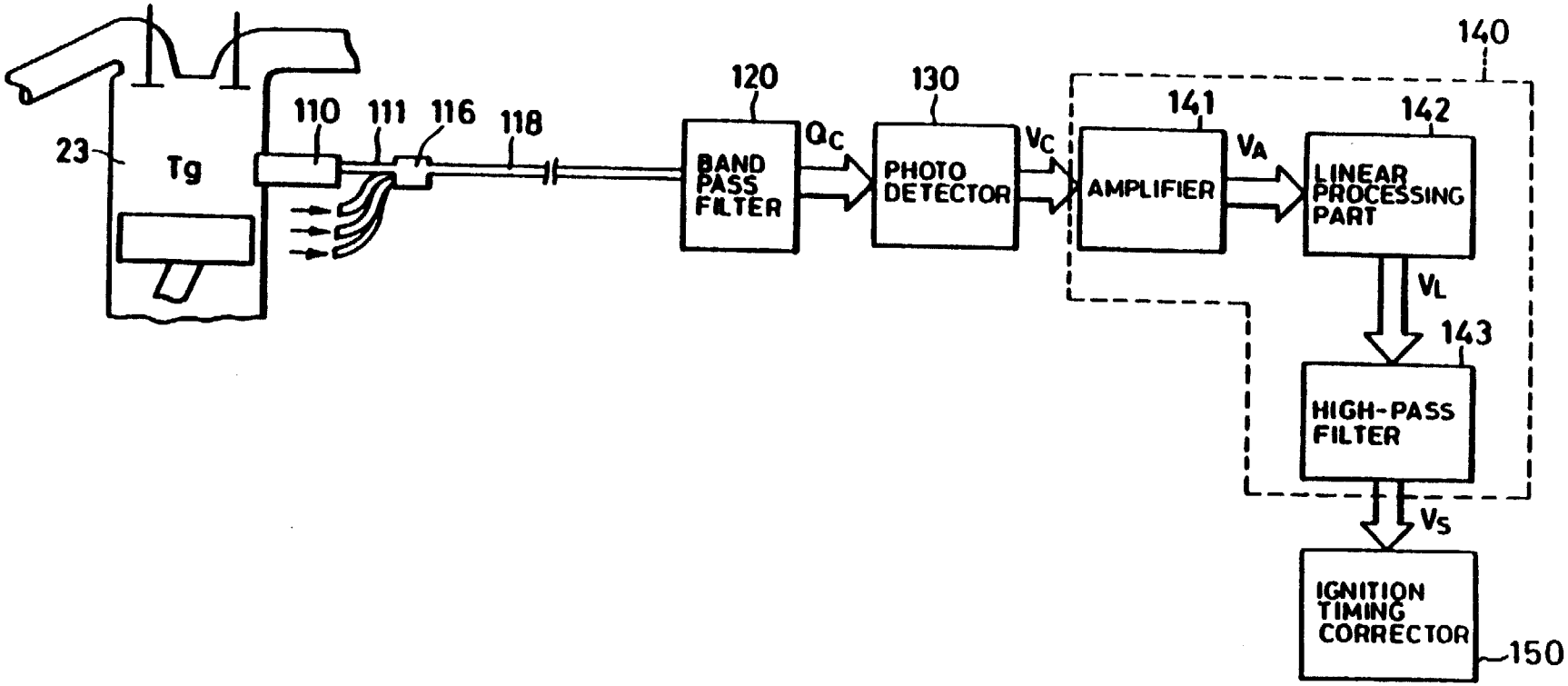
FIG. 26 is a block diagram of an embodiment of a knock control apparatus.

Referring first to FIG. 26, the structure of an embodiment of knock control apparatus according to the invention will be explained.

In FIG. 26, in a combustion chamber 23 of an engine, a detector 110 for detecting a change in the temperature in the combustion chamber 23 is disposed, and the signal detected by the detector 110 is inputted to a band-pass filter 120 by an optical transmission element 111, a connector 116 and an optical fiber 118. The output terminal of the band-pass filter 120 is connected to the input terminal of a photo detector 130, and the output terminal of the photo detector 130 is connected to the input terminal of a shaping circuit 140. The shaping circuit 140 comprises a signal amplifier 141, a linear processing part 142, and a high pass filter 143. The output terminal of the photo detector 130 is connected to the input terminal of the signal amplifier 141, the output terminal of which is connected to the input terminal of the linear processing portion 142. The output terminal of the linear processing part 142 is connected to the input terminal of the high pass filter 143, the output terminal of which is, in turn, connected to the input terminal of an ignition timing correcting means 150.

The detector 110 is the same as disclosed in FIGS. 16 to 18. The detector as shown in FIG. 19 also can be used for the knock control apparatus.

The structure of each part of the embodiment will now be explained in more detail further referring to FIGS. 20 and 27 to 30.

Referring to FIG. 20, there is shown a relationship between the spectral radiant energy and the wavelength of the black body with temperature as a parameter. The detector 110 disposed in the combustion chamber 23 receives heat, and the black body or film 112 generally produces radiant energy such as that shown in FIG. 20 in correspondence with a temperature. Accordingly, a temperature at a certain wavelength is obtained by measuring the radiant energy at that wavelength.

Since the combustion temperature in the combustion chamber 23 is 1,000° to 2,500° C., a band-pass filter having a transmission range of 0.6 to 0.7 μm is used as the band-pass filter 120 in FIG. 26, so as to detect a temperature in the range of 1,000° to 2,500° C.

Figure 27A:
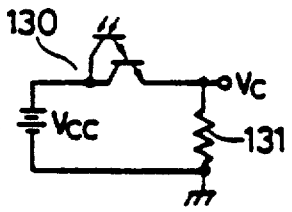
FIG. 27a is a diagram showing a circuit of photo detector.

In this embodiment, an Si photo transistor having a circuit structure such as that shown in FIG. 27a is used as the photo detector 130, and a load resistance 131 is connected between the emitter and the ground at the output stage of the photo transistor. A bias voltage Vcc is applied between the collector and the ground of the photo transistor.

Figure 29:
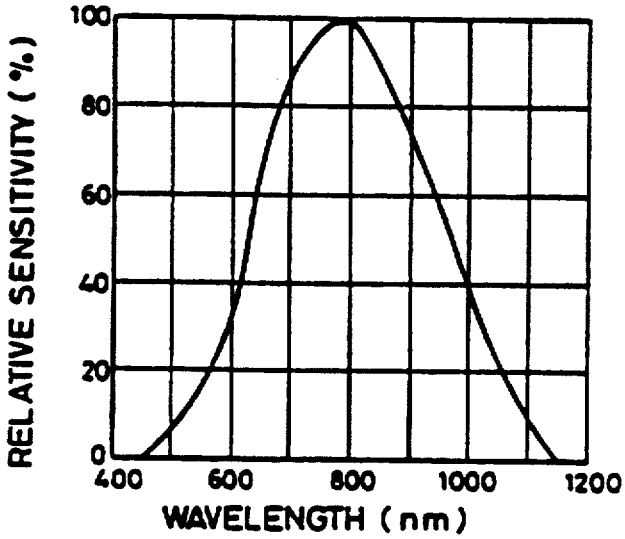
FIG. 29 shows a relationship between the wavelength and relative sensitivity of the photo detector.

FIG. 29 shows the characteristics of the Si photo transistor used as the photo detector 130 in this embodiment. It is possible to detect light in the wavelength range of 500 to 1,200 nm.

Figure 30:
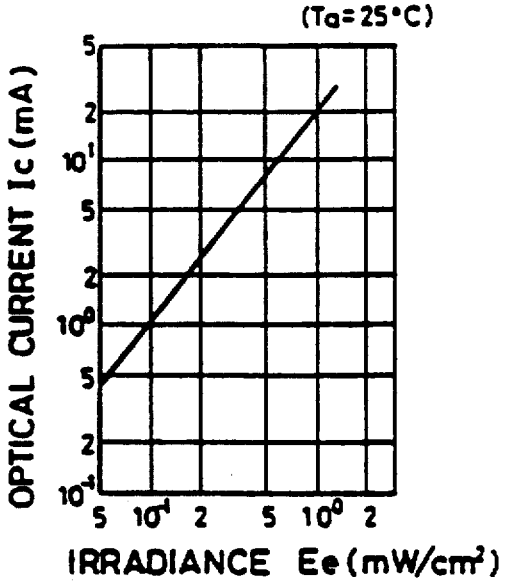
FIG. 30 shows a relationship between the radiation illuminance of the photo detector and the optical current.

In the case of using an Si photo transistor as the photo detector 130 in this way, if the combustion temperature varies in the range of 1,000° to 2,000° C. at the time of generation of knock, for example, the radiant energy varies in the range of $5\times10^{-1}$ to 1 mW/cm$^2$, as shown in FIG. 20, so that the collector current Ic varies in the range of 0.8 to 2 mA, as shown in FIG. 30.

In order to convert the collector current Ic produced in the above-described way into a voltage, a load resistance of 0.1 kΩ is connected as the load resistance 131 in FIG. 27a in this embodiment.

Figure 27B:
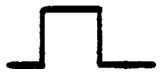
FIGS. 27b and 27c are diagrams showing input waveform and output waveform, respectively, of the photo detector.
Figure 27C:
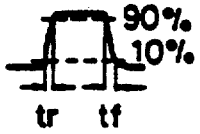
Figure 28:
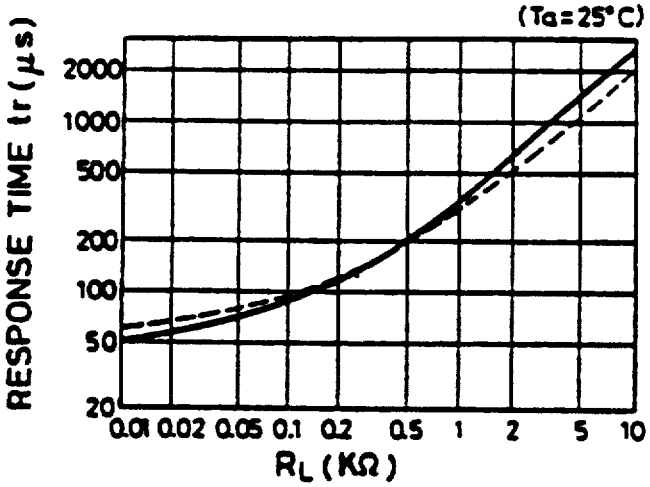
FIG. 28 is a graph showing a relationship between the load resistance and the response time of the photo detector.

When the Si photo transistor is used as the photo detector 130 in this way, the output signal with respect to the input signal shown in FIG. 27b takes a same form such as that shown in FIG. 27c. There is a relationship such as that shown in FIG. 28 between the response time $t_r$ shown in FIG. 27c and the load resistance 131.

Since it is necessary to detect a change in the temperature for a period of about 10 KHz for the purpose of detecting knock the value of 0.1 kΩ is selected as the load resistance, as described above.

The operation of this embodiment will be explained with reference to FIGS. 31 to 36.

Figure 31:
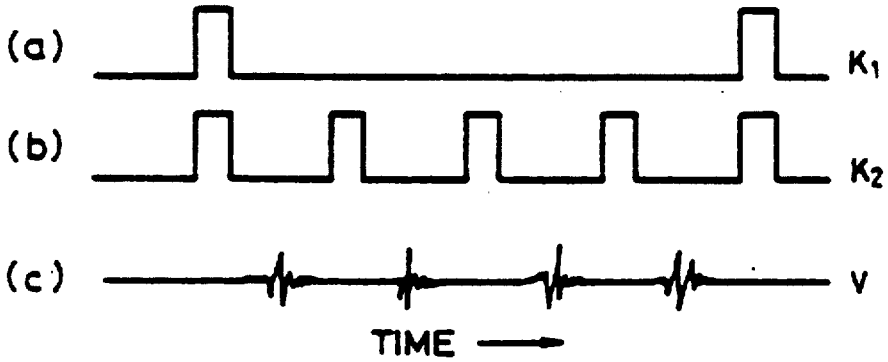
FIGS. 31a–c show the waveforms of a knock signal and a cylinder discrimination signal.
Figure 34:
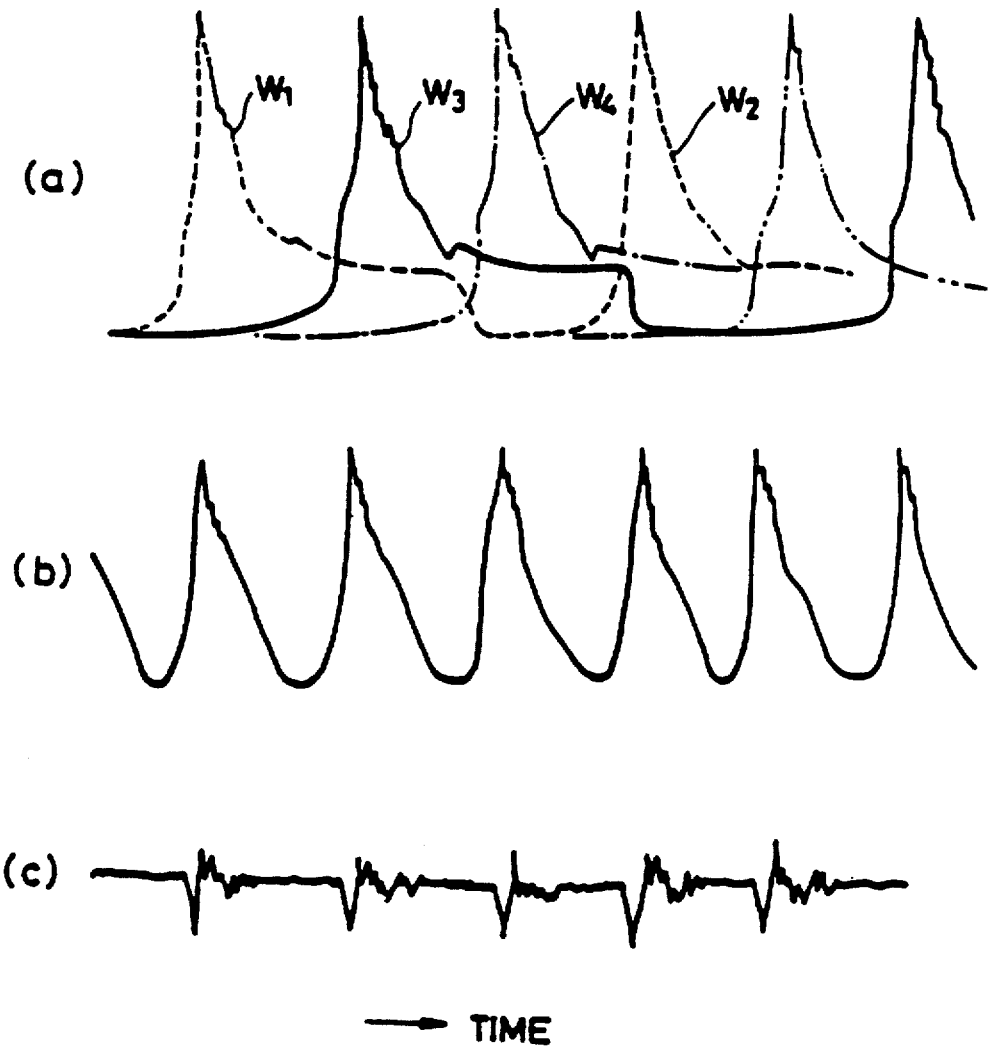
FIG. 34 is graphs (a) to (c) showing the waveform of the detection signals obtained from the respective cylinders of the engine, the waveform of the knock signal taken out by the optical transmission element, and the waveform of the knock signal obtained by the shaping circuit in the embodiment of the present invention, respectively.

A cylinder discrimination signal such as those shown by (a) and (b) of FIG. 31 and a knock such as that shown by (c) of FIG. 31 are produced from the engine. A change in the temperature corresponding to the spectral radiant energy of the knock which is indicated by the symbol $W_1$ to $W_4$ in (a) of FIG. 34 is detected by the detector 110 shown in FIG. 26 in correspondence with each cylinder. The thus-detected signal is taken out of the combustion chamber 23 of the engine by the optical transmission element 111 as a time series optical signal such as that shown by (b) of FIG. 34, and input to the band-pass filter 120 by the optical fiber 118 through the connecting member 116.

The band-pass filter 120 has a pass band at 0.6 to 0.7 μm, and an optical signal Qc corresponding to a combustion temperature of 1,000° to 2,500° C. in the combustion chamber 23 is supplied to the photo detector 130 through the band-pass filter 120.

Figure 33:
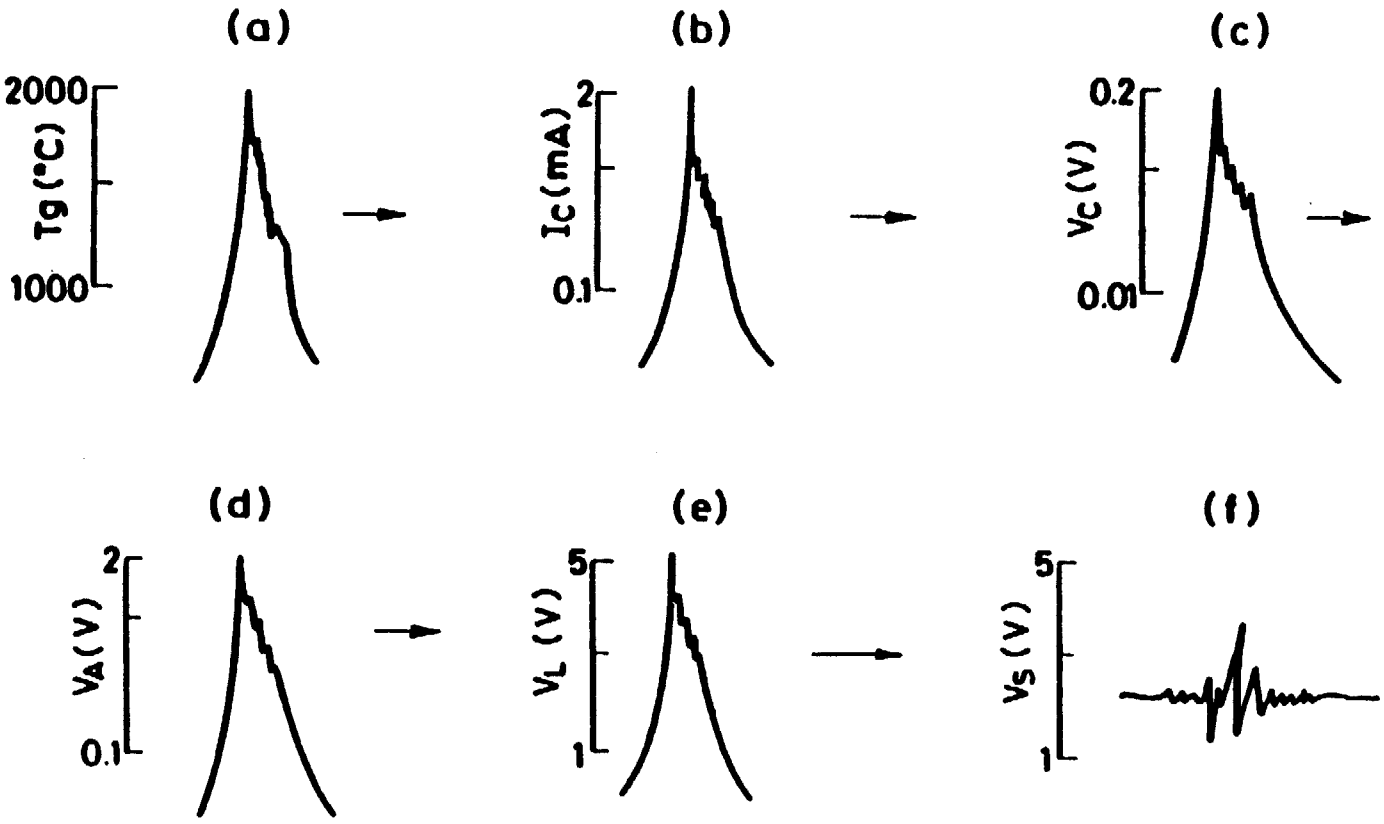
FIG. 33 is graphs (a) to (f) showing the waveforms of the knock signal at the respective stages in the embodiment.

The photo detector 130 is composed of the Si photo transistor, as described above. As shown in FIG. 33, a collector current such as that shown by (b) is caused to flow in accordance with the above-described optical signal such as that shown by (a), so that an output voltage signal such as that shown by (c) is obtained. The output voltage signal $V_c$ is amplified by the signal amplifier 141 so as to form an output voltage signal $V_A$ such as that shown by (d) of FIG. 33, which is further linearized by the linear processing part 142 so as to form an output voltage signal $V_L$ such as that shown by (e) of FIG. 33. The output voltage signal $V_L$ is supplied as an input to the high pass filter 143 having a pass band at above 4 KHz.

The high pass filter 143 takes only the knock component out of the output voltage signal $V_L$, and a knock signal $V_S$ such as that shown by (f) of FIG. 33 is inputted from the high pass filter 143 to the ignition time correcting means 150.

Figure 36:
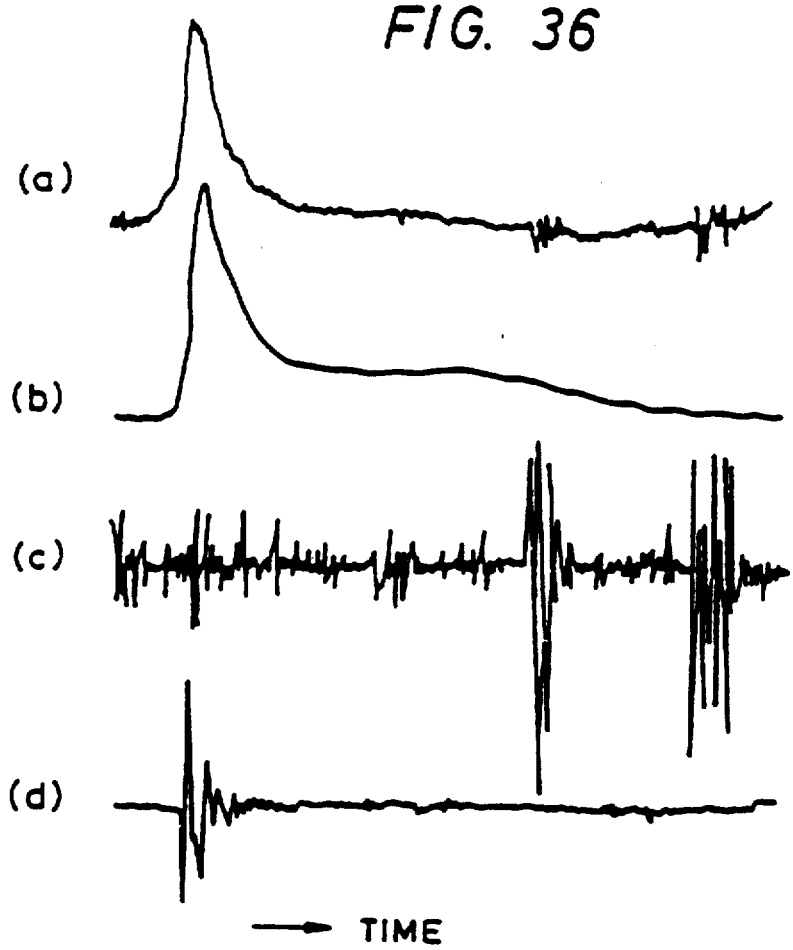
FIG. 36 is graphs (a) to (d) respectively showing the knock waveform detected by a piezoelectric element, the knock waveform detected by the detector of the present invention, the waveform of distribution of the high frequency components of the knock waveform detected by the piezoelectric element, the waveform of distribution of the high frequency components of the knock waveform detected by the detector of the present invention.

In this way, according to this embodiment, a knock signal $V_S$ such as that shown by (d) of FIG. 36 is supplied to the output terminal of the shaping circuit 140. In contrast, (c) of FIG. 36 shows that the knock signal shaped in the same process as in the present invention and detected by a piezoelectric element is mixed with the vibration caused by other factors than knock, thereby making discrimination between them impossible. Incidentally, measurement in FIG. 36 was carried out when the number of revolutions of the engine was 6,000 rpm.

As described above, the ignition timing correcting means 150 corrects the ignition timing of the engine in accordance with the knock signal $V_S$ which has been inputted to the output terminal of the shaping circuit 140.

Figure 32A:
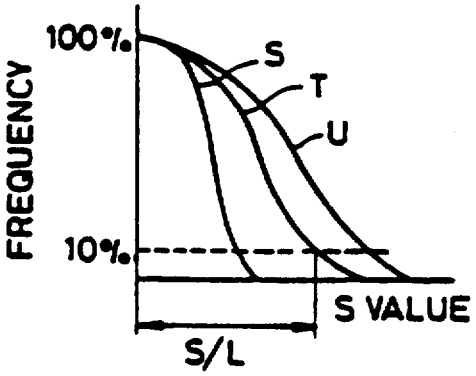
FIGS. 32(a) and 32(b) each are a graph showing the relationship curve of the knock level and the cumulative frequency distribution at which the knock is judged.
Figure 32B:
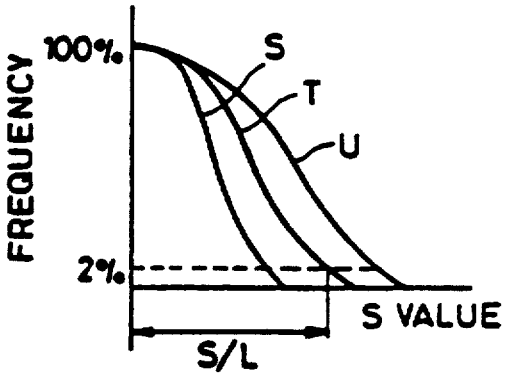

FIGS. 32a and 32b are the curves obtained by the statistical processing of the cumulative frequency distribution of the S values for 1024 igniting operations which are obtained by converting the optical signals after passing them through the band-pass filter 120 shown by (c) of FIG. 31 relative to the state S in which no knock is generated, the state T in which trace knock is generated and the state U in which knock is generated, respectively.

By using these curves, the ignition timing of the engine is corrected in the following way.

Figure 35:
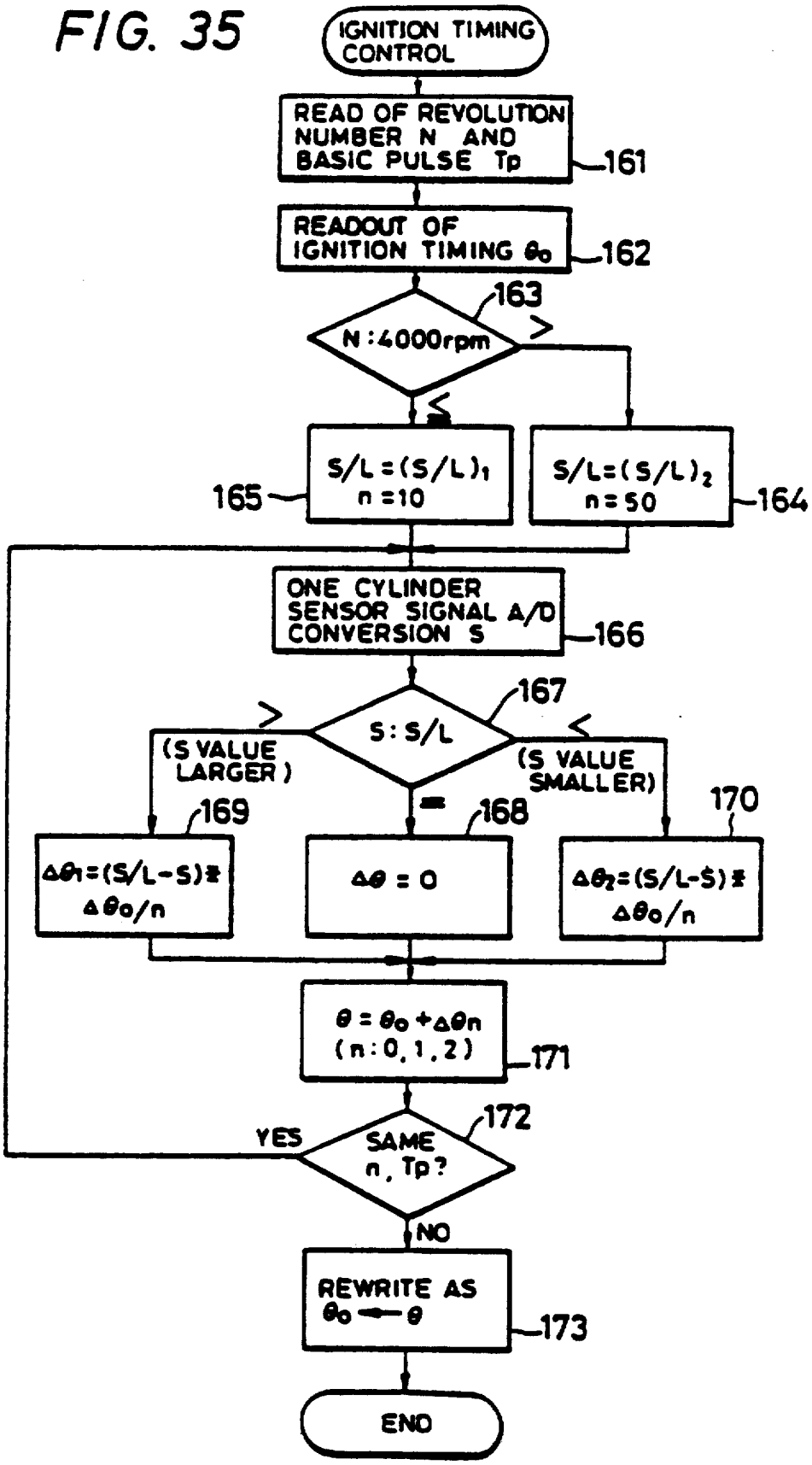
FIG. 35 is a flow chart of the operation of the embodiment of the present invention.

At step 161 in the flow chart of FIG. 35, the number N of revolutions of the engine and the basic injection pulse width $$T_p(=Q_A/N)$$

are fetched, and at step 162, the optimum ignition timing $\theta_0$ is read from the map on the basis of the values fetched at the step 161.

At step 163, judgement is made as to whether or not the number N of revolutions of the engine is not more than 4,000 rpm, and if the answer is yes, the process proceeds to step 165.

At the step 165, the S/L value is set at the position at which the sensor signal exceeds the slicing level by 10% in the trace knock state, as shown in FIG. 32a.

On the other hand, if the number N of revolutions of the engine is judged to be larger than 4,000 rpm at the step 163, the process proceeds to step 164. Since it is dangerous that the S values larger than those in the trace knock state continue when the engine is rotated at such a high speed, the S/L value is set at the position at which the sensor signal exceeds the slicing level by 2% in the trace knock state, as shown in FIG. 32b.

The S/L values set at the steps 164 and 165 have been obtained in advance from experiments.

The process next proceeds to step 166, and the knock signal $V_S$ of one cylinder obtained in the above-described way is subjected to A/D conversion to obtain the S value. At step 167, the thus-obtained S value is compared with the S/L value which has been obtained in advance.

If it is found from the comparison that the S value is larger than the S/L value which has been preset in correspondence with the rotational speed of the engine, the engine is judged to be in the knock state, whereby the delay control of the ignition timing is carried out. On the other hand, if the S value is smaller than the preset S/L value, it is judged that no knock is generated, whereby the advanced control of the ignition timing is executed.

In this case, in order to make the distribution of the S values coincide with that in the trace knock state, the ratio of the S values which are judged to show the knock state and the ratio of advanced control angle/-delay control angle are controlled in combination with each other. More specifically, if it is assumed that the generation ratio of the S values larger than the S/L is 10%, since the advance control is carried out once for every ten igniting operations in the state in which the ignition timing is stably controlled, the ratio of the advanced control angle to the delay control angle is set at 1:10. For example, if the S value has changed by $+\Delta S$ with respect to the preset S/L value, the ignition time is delayed by $\Delta\theta_1$, and if the S value has changed by $-\Delta S$ with respect to the preset S/L value, the ignition timing is advanced by $\Delta\theta_2$, and $\Delta\theta_1/\Delta\theta_2$ is set at 1/10.

In this way, if the S value is equal to the preset S/L value at the step 167, the process proceeds to step 168 without any correction of the ignition timing. If the S value is larger than the present S/L value at the step 167, the process proceeds to step 169 to set the delay control angle of $\Delta\theta_1$, and at step 171 the ignition timing is subjected to delay control so as to be $\theta=\theta_0+\Delta\theta_1$.

On the other hand, if the S value is judged to be smaller than the preset S/L value at the step 167, the process proceeds to step 170 to set the advanced control angle of $\Delta\theta_2$, and at the step 171 the ignition timing is subjected to advanced control so as to be $\theta=\theta_0+\Delta\theta_2$.

This process next proceeds to step 672 to judge whether or not n and Tp are the same. If the answer is in the affirmative, the operation of the steps 166 to 172 are repeated. On the other hand, if the answer is in the negative at the step 172, $\theta$ is reloaded as $\theta_0$ at step 173.

In this embodiment, the ratio of the advanced control angle to the delay control angle is set at 1:10 in the case where the rotational speed of the engine is lower than 4,000 rpm, and it is set at 1:50 in the case where the rotational speed of the engine is 4,000 rpm or higher. In this way, by making the frequency distribution of the S values coincide with that in the trace knock state and operating the engine in the state indicated by the curve c in FIG. 37, it is possible to obtain the maximum *power* output efficiency.

As described above, according to the embodiment of the present invention, since a change in the temperature in the combustion chamber is detected by utilizing the radiation of a black body and a knock signal is obtained on the basis of this detected signal, it is impossible to detect the strength of the knock without an error due to vibration even in a high-speed rotational state of the engine or an error due to the detection surface smudged by soot or the like. Since the ignition timing of the engine is corrected on the basis of the thus-detected strength of the knock, this embodiment of the present invention enables the engine to be operated constantly in the trace knock state, thereby obtaining the output of the maximum efficiency.

What is claimed is:

1. A lean-burn control apparatus, having a digital arithmetic unit to which signals are inputted from a plurality of detectors for detecting an operational state of an internal combustion engine and an air fuel ratio detector, and controlling a fuel air ratio and ignition timing according to output signals from said arithmetic unit, characterized by misfire detecting means for detecting a misfiring state of said engine;

means for detecting NOx concentration information of said engine; and means for controlling said fuel air ratio and said ignition timing so as to fall within a tolerable stable combustion range which is defined based on signals from misfire detector and said NOx concentration information detector, and in which combustion is stable and produces NOx of a tolerable concentration.

2. A lean-burn control apparatus according to claim 1, wherein said misfire detecting means is a detector for measuring the intensity of the combustion light of said engine, and said NOx concentration detecting means is a detector for measuring the intensity of said combustion light of said engine having a specific wavelength.

3. A lean-burn control apparatus according to claim 1, wherein said misfire detecting means and said NOx concentration detecting means are detectors for converting said combustion light of said engine into a temperature.

4. A lean-burn control apparatus according to claim 1, wherein said misfire detecting means and NOx concentration detecting means are a temperature detector comprising an optical transmission element, and a black body disposed in a combustion chamber of said engine and mounted on said optical transmission element.

5. A lean-burn control apparatus according to claim 4, wherein said transmission element is of quartz, said black body is a thin film adhered to an end portion of said optical transmission element so as to cover said end portion and made of one element selected from a group consisting of iridium, platinum, zirconium nitride and graphite.

6. A combustion control apparatus for an internal combustion engine having a plurality of cylinders and means for generating a timing signal relating to the timing of firing of combustion in said cylinders, comprising:

a plurality of combustion flame optical sensors, each associated with a respective cylinder, for detecting firing of combustion in said cylinders;

a plurality of optical fiber cables, each connected to a respective one of said combustion flame optical sensors;

an optical signal processing circuit connected to all of said optical fiber cables to produce an output signal having a series of pulses each corresponding to an optical signal of a respective optical sensor;

detecting means responsive to said timing signal and said output signal of said optical signal processing unit for detecting a condition of combustion in said cylinders on the basis of said series of pulses; and means for controlling at least one of fuel air ratio and ignition timing in said internal combustion engine using detected conditions of combustion in said cylinders.

7. A combustion control apparatus according to claim 6, wherein said controlling means operates to control both fuel air ratio and ignition timing.

8. A combustion control apparatus for an internal combustion engine having a plurality of cylinders, comprising:

a combustion flame optical sensor, associated with a cylinder for detecting firing combustion in said cylinder, said optical sensor having a non-linear characteristic;

optical signal processing means connected to said optical sensor for converting an optical output thereof to an electrical signal output;

linear processing means connected to said optical signal processing means for linearizing said electrical signal output thereof; and means for controlling at least one of fuel air ratio and ignition timing in said internal combustion engine using an output of said linear processing means.

9. A combustion control apparatus according to claim 8, wherein filter means is connected to said linear processing means for filtering said linearized electrical signal.

10. A combustion control apparatus according to claim 8, wherein said controlling means operates to control both fuel air ratio and ignition timing.

11. A method of controlling fuel air ratio and ignition timing in an internal combustion engine so as to maintain values of fuel air ratio and ignition timing within a target range in which combustion is stable and NOx concentration is tolerable, comprising the steps of:

(a) detecting a misfiring state of said engine;

(b) detecting NOx concentration information of said engine; and (c) adjusting the value of at least one of fuel air ratio and ignition timing so that both fuel air ratio and ignition timing fall within a target range defined by a misfire boundary and a predetermined NOx concentration boundary.

12. A method according to claim 11, wherein said step (c) comprises adjusting the value of both said fuel air ratio and said ignition timing to cause both fuel air ratio and ignition timing to fall within said target range.

13. A method according to claim 11, wherein step (a) comprises measuring the intensity of combustion light in a cylinder of the engine, and step (b) comprises measuring the intensity of a specific wavelength of combustion light.

*14. A method of detecting misfire of an internal combustion engine, comprising the steps of:*

*detecting combustion light intensity in respective combustion chambers of the engine;*

*converting the detected combustion light intensity of a combustion chamber into an electrical signal corresponding to a measure of the detected combustion light intensity;*

*comparing the level of said electrical signal with a predetermined slice level; and*

*detecting misfire when a signal level of the electrical signal is less than the slice level.*

*15. A method of detecting misfire of an internal combustion engine, according to claim 14, and further comprising the steps of counting a number of times of the misfire occurring for a prescribed number of power cycles;*

*calculating an average number of times of the misfire in one power cycle; and*

*comparing the average number of times of misfire with a predetermined value to judge that the engine is in a misfire condition when the average number of times is larger than the predetermined value.*

*16. A method of detecting misfire of an internal combustion engine, comprising the steps of:*

*detecting combustion temperature in respective cylinders of the engine;*

*converting the detected combustion temperature of a cylinder into an electrical signal corresponding to a measure of the detected combustion temperature;*

*comparing the electrical signal with a predetermined level; and*

*judging a misfire condition of the engine when the electrical signal is less than the predetermined level.*

*17. A method according to claim 16, wherein judgement of the misfire is effected at each power cycle.*

*18. A method according to claim 16, and further comprising the steps of:*

*counting misfire signals each of which is an electrical signal having a level which is less than said predetermined level and is outputted for a prescribed number of power cycles;*

*calculating an average number of times of occurrence of the misfire signal;*

*comparing the calculated average number of times with a predetermined value; and*

*judging a misfire condition of the engine when the calculated average number of times is larger than the prescribed value.*

*19. A method of detecting a condition of operation of an internal combustion engine, comprising the steps of:*

*detecting combustion light intensity in respective combustion chambers of the engine:*

*converting the detected light intensity of a combustion chamber into the electrical signal corresponding to a*

*measure of the detected combustion light intensity; and*

*comparing the electrical signal with a predetermined slice level and judging that the engine is operating outside of an allowable limit of NOx emission when the signal level of the electrical signal is less than said predetermined slice level.*

*20. A method of detecting a condition of operation of an internal combustion engine according to claim 19, wherein an average value of combustion light intensity is determined for a prescribed number of power cycles; and*

*said average value is compared with a predetermined level for judging a misfire condition of the engine.*

*21. A method of detecting a condition of an internal combustion engine, comprising the steps of:*

*detecting combustion light intensity in respective combustion chambers of the engine;*

*converting the detected combustion light intensity of a combustion chamber into an electrical signal corresponding to a measure of the detected combustion light intensity; and*

*detecting an amount of NOx emitted from the engine on the basis of said electrical signal.*

*22. An apparatus for controlling an internal combustion engine, comprising:*

*means for detecting combustion light intensity in respective combustion chambers of the engine;*

*means for converting detected combustion light intensity of a combustion chamber into an electrical signal corresponding to a measure of the detected combustion light intensity;*

*means for comparing the electrical signal with a predetermined slice level and judging that the engine is operating in a misfire condition when the signal level of the electrical signal is less than the predetermined slice level; and*

*means for controlling at least one of fuel air ratio and ignition timing until no misfire takes place.*

*23. An apparatus for controlling an internal combustion engine, comprising:*

*means for detecting combustion temperature in respective combustion chambers of the engine;*

*means for converting detected combustion temperature of a combustion chamber into an electrical signal corresponding to a measure of the detected combustion temperature;*

*means for comparing the electrical signal with a predetermined level and judging that the engine is operating in a misfire condition when the signal level of the electrical signal is less than the predetermined level; and*

*means for controlling at least one of fuel air ratio and ignition timing until no misfire takes place.*

*24. An apparatus for controlling an internal combustion engine, comprising:*

*means for detecting combustion light intensity in respective combustion chambers of the engine;*

*means for converting detected combustion light intensity into an electrical signal corresponding a measure of the detected combustion light intensity;*

*means for comparing the electrical signal with a predetermined level corresponding to an allowable limit of NOx exhausted from the engine and judging the amount of NOx to be outside of the limit when a signal level of the electrical signal is equal to or larger than the predetermined level; and*

*means for controlling at least one of fuel air ratio and ignition timing until the amount of NOx is within an allowable limit.*

* * * * *